US012790507B2

(12) United States Patent
Brown

(10) Patent No.: US 12,790,507 B2
(45) Date of Patent: Nov. 10, 2026

(54) BIODEGRADABLE MATERIAL

(71) Applicant: Terram Technologies, Inc., Scottsdale, AZ (US)

(72) Inventor: John Grady Brown, Hoover, AL (US)

(73) Assignee: Terram Technologies, Inc., Scottsdale, AZ (US)

( * ) Notice: Subject to any disclaimer, the term of this patent is extended or adjusted under 35 U.S.C. 154(b) by 631 days.

(21) Appl. No.: 17/626,489

(22) PCT Filed: Jul. 13, 2020

(86) PCT No.: PCT/US2020/041855
§ 371 (c)(1),
(2) Date: Jan. 11, 2022

(87) PCT Pub. No.: WO2021/007579
PCT Pub. Date: Jan. 14, 2021

(65) Prior Publication Data
US 2022/0289999 A1 Sep. 15, 2022

Related U.S. Application Data

(60) Provisional application No. 62/946,841, filed on Dec. 11, 2019, provisional application No. 62/872,799, filed on Jul. 11, 2019.

(51) Int. Cl.
*C09D 105/04* (2006.01)
*C08K 5/053* (2006.01)
(Continued)

(52) U.S. Cl.
CPC ....... *C09D 105/04* (2013.01); *C09D 101/284* (2013.01); *C08K 5/053* (2013.01)

(58) Field of Classification Search
None
See application file for complete search history.

(56) References Cited

U.S. PATENT DOCUMENTS 4,369,172 A 1/1983 Schor et al.
5,102,666 A * 4/1992 Acharya ................ A61Q 11/00 424/443

(Continued)

FOREIGN PATENT DOCUMENTS

CN 102120514 7/2011
WO WO-2012028702 A1 * 3/2012 .............. A61J 3/077
WO 2018234680 A1 12/2018

OTHER PUBLICATIONS

Innerebner, WO 2012/028702 A1, English translation (Year: 2012).*

(Continued)

*Primary Examiner* — Frank J Vineis
*Assistant Examiner* — Nicole T Gugliotta
(74) *Attorney, Agent, or Firm* — AddyHart LLC; Michael K. Kelly

(57) ABSTRACT

A novel biodegradable material for use in packaging applications, including food packaging applications, is provided. The disclosed biodegradable material is simple and cost efficient to manufacture, provides a superior water vapor barrier and/or oxygen barrier that is superior to prior art biodegradable and/or compostable materials used in packaging applications, and can withstand exposure to a wide variety of physical and chemical environments.

10 Claims, 3 Drawing Sheets

(51) Int. Cl.
*C08L 5/04* (2006.01)
*C09D 101/28* (2006.01)

(56) References Cited

U.S. PATENT DOCUMENTS

| | | | | |
|---|---|---|---|---|
| 5,840,777 | A | 11/1998 | Eagles et al. | |
| 6,352,719 | B1 | 3/2002 | Brown et al. | |
| 2008/0033392 | A1 | 2/2008 | Gaserod et al. | |
| 2010/0316739 | A1 | 12/2010 | Nisis | |
| 2016/0184234 | A1* | 6/2016 | Poznansky | A61L 27/38 424/422 |
| 2021/0177761 | A1* | 6/2021 | Sciamanna | A61K 9/5161 |

OTHER PUBLICATIONS

Hu et al., "Construction and evaluation of the hydroxypropyl methyl cellulose-sodium alginate composite hydrogel system for sustained drug release," Journal of Polymer Research (2018) 25:148 (Year: 2018).*

Ghosal, et al., "Aliginate/hydrophobic HPMC (60M) particulate systems: New matrix for site-specific and controlled drug delivery," Brazilian Journal of Pharmaceutical Sciences, Dec. 2011, pp. 833-844, vol. 47, No. 4.

Mantilla, N., et al., Multilayered antimicrobial edible coating and its effect on quality and shelf-life of fresh-cut pineapple (*Ananas comosus*), LWT-Food Science and Technology, vol. 51, No. 1, Apr. 1, 2013, pp. 37-43, United Kingdom.

Rhim, Jong-Whan, et al., Physical and mechanical properties of water resistance sodium alginate films, LWT—Food Science and Technology, vol. 37, No. 3, May 1, 2004, pp. 323-330, United Kingdom.

Bourlieu-Lacanal, Claire, et al., Edible moisture barriers: materials, shaping techniques and promises in food product stabilization, Food Materials Science: Principles and Practice, Jan. 1, 2007, https://hal.archives-ouvertes.fr/hal-01454497.

* cited by examiner

DETAIL B
SCALE 2 : 1

BIODEGRADABLE MATERIAL

CROSS-REFERENCE TO RELATED APPLICATIONS

This application is a national stage under 35 U.S.C. 371 of International Application No. PCT/US2020/041855 having an international filing date of Jul. 13, 2020 (currently published), which claims priority to U.S. Provisional Patent Application No. 62/872,799 filed on Jul. 11, 2019 and U.S. Provisional Patent Application No. 62/946,841 filed on Jul. 13, 2019.

FIELD OF THE DISCLOSURE

The present disclosure relates generally to materials used in the packaging of items. More specifically, the present disclosure relates to a biodegradable material used in the packaging of items, particularly food items.

BACKGROUND OF THE DISCLOSURE

Advances in food preservation and food packaging techniques play a major role in maximizing the utilization of food products, increasing the efficiency of the food distribution chain and keeping the food supply safe. Food packaging maintains the benefits of food processing after the completion of the process, enabling foods to be transported safely for long distances from their point of origin and still be wholesome at the time of consumption. Plastics are currently the most common packaging material for a wide range of products, including food products. Plastics can be used in various forms, such as containers, sheets, films, tubing, and fillers. Plastics are popular due to their cost-effectiveness, ease of manufacturing, and suitability for large-scale production. In addition, plastics provide a rigid structure and result in an excellent water vapor and oxygen barrier, which has particular benefits in the food industry. However, problems associated with the handling of a large number of waste plastic products and the limited volume of landfill facilities have placed added emphasis on developing products which are either biodegradable or recyclable.

There are various types of biodegradable and/or compostable materials that can be used for packaging, particularly for packaging food items. However, current materials that are biodegradable and/or compostable suffer from several drawbacks. First, current packaging materials that are biodegradable and/or compostable are expensive to produce or utilize complicated manufacturing processes, prohibiting their use in many types of packaging. A second drawback is that many existing biodegradable and/or compostable packaging materials require valuable raw materials for manufacture, diverting such resources from other purposes Third, in the foods industry different kinds of foods have particular packaging requirements and many of the current biodegradable and/or compostable packaging materials do not meet the specifications for many food products (for example, a particular food may require the food item be subject to high temperatures in the presence of the packaging materials). As a result, different types of biodegradable and/or compostable packaging materials may need to be used by a single entity, significantly increasing costs and complexity of operations.

The present disclosure addresses these and other problems of the prior art by providing a novel biodegradable material that can be used in packaging applications to package a variety of products, including, but not limited to, food products. The disclosed biodegradable material is simple and cost efficient to manufacture, manufactured with natural materials and/or materials suitable for use with a variety of products (including fed products), provides a water vapor barrier and/or oxygen barrier that is superior to prior art biodegradable and/or compostable materials used in packaging applications, and can withstand exposure to a wide variety of physical and chemical environments.

SUMMARY OF THE DISCLOSURE

The present disclosure provides a biodegradable material that can be used as a packaging material for a variety of items, including a wide range of food products, either alone or in combination with a substrate. While the materials described in the present disclosure are described for use in conjunction with the food industry, the materials may be used in industries other than the food industry and the disclosure herein should not be construed as limited to an application in the food industry. In one application, the present disclosure provides a material that can be applied as a coating material to a substrate, preferably a biodegradable substrate.

In a first embodiment, the biodegradable material comprises two polymer components, polymer 1 and polymer 2, and optionally one or more of a linking agent, a plasticizer, a surfactant, a stabilizer and a preservative. In one aspect of this embodiment, the biodegradable material is in the form of a liquid. In another aspect of this embodiment, the biodegradable material is in the form of a liquid and the biodegradable material is converted to a linked network at a point subsequent to application of the biodegradable material to the substrate.

In a second embodiment, the biodegradable material comprises two polymer components, polymer 1 and polymer 2, a linking agent, and optionally one or more of a plasticizer, a stabilizer, a surfactant, and a preservative. In one aspect of this embodiment, the biodegradable material is in the form of a liquid when applied to a substrate. In another aspect of this embodiment, the biodegradable material is in the form of a liquid when applied to a substrate and the biodegradable material is converted to a linked network at a point subsequent to application of the biodegradable material to the substrate.

In a third embodiment, the biodegradable material comprises two polymer components, polymer 1 and polymer 2, a linking agent, a plasticizer and optionally one or more of a stabilizer, a surfactant, and a preservative. In one aspect of this embodiment, the biodegradable material is in the form of a liquid when applied to a substrate. In another aspect of this embodiment, the biodegradable material is in the form of a liquid when applied to a substrate and the biodegradable material is converted to a linked network at a point subsequent to application of the biodegradable material to the substrate.

In a fourth embodiment, the biodegradable material comprises two polymer components, polymer 1 and polymer 2, a linking agent, a plasticizer, a stabilizer and optionally one or more of a surfactant and a preservative. In one aspect of this embodiment, the biodegradable material is in the form of a liquid when applied to a substrate. In another aspect of this embodiment, the biodegradable material is in the form of a liquid when applied to a substrate and the biodegradable material is converted to a linked network at a point subsequent to application of the biodegradable material to the substrate.

In a fifth embodiment, the biodegradable material comprises two polymer components, polymer 1 and polymer 2, a linking agent, a plasticizer, a stabilizer, a preservative, and optionally a surfactant. In one aspect of this embodiment, the biodegradable material is in the form of a liquid when applied to a substrate. In another aspect of this embodiment, the biodegradable material is in the form of a liquid when applied to a substrate and the biodegradable material is converted to a linked network at a point subsequent to application of the biodegradable material to the substrate.

In a sixth embodiment, the present disclosure provides for a biodegradable material in combination with a substrate. In one aspect of this embodiment, the biodegradable material is applied to the substrate as a liquid. In another aspect of this embodiment, the biodegradable material is applied to the substrate as a liquid and the biodegradable material forms a linked network on the substrate at a point subsequent to application of the biodegradable material to the substrate (for example, after the addition of the linking agent). In such an embodiment, polymer 1 and polymer 2 of the biodegradable material may be applied to the substrate simultaneously or sequentially. Any of the biodegradable materials of the first to fifth aspects may be used in combination with the substrate.

In a seventh embodiment, the present disclosure provides for a biodegradable material in combination with a substrate, wherein the biodegradable material is applied as a single layer to the substrate. In one aspect of this embodiment, the biodegradable material is applied to the substrate as a liquid. In another aspect of this embodiment, the biodegradable material is applied to the substrate as a liquid and the biodegradable material forms a linked network on the substrate at a point subsequent to application of the biodegradable material to the substrate (for example, after the addition of the linking agent). Any of the biodegradable materials of the first to fifth aspects may be used in combination with the substrate. In such an embodiment, polymer 1 and polymer 2 of the biodegradable material are preferably applied to the substrate simultaneously.

In an eighth embodiment, the present disclosure provides for a biodegradable material in combination with a substrate, wherein the biodegradable material is applied as two or more layers to the substrate (such as, but not limited to 2 to 12 layers). In one aspect of this embodiment, the biodegradable material is applied to the substrate as a liquid. In another aspect of this embodiment, the biodegradable material is applied to the substrate as a liquid and the biodegradable material forms a linked network on the substrate at a point subsequent to application of the biodegradable material to the substrate (for example, after the addition of the linking agent). Any of the biodegradable materials of the first to fifth aspects may be used in combination with the substrate. In such an embodiment, polymer 1 and polymer 2 of the biodegradable material are preferably applied to the substrate sequentially. When the material comprises two or more layers, the functions of each layer may be the same, may be different, or the two or more layers may cooperatively interact to achieve the same function. Further, when the material comprises two or more layers, the biodegradable material comprises at least one layer of polymer A and one layer of polymer B and optionally additional layers of polymer A and B (wherein the number of layers of polymer A and B are not required to be equal to one another).

In a ninth embodiment, the present disclosure provides for a biodegradable material in combination with a substrate, wherein the biodegradable material is applied as 5 or 7 layers to the substrate. In one aspect of this embodiment, the biodegradable material is applied to the substrate as a liquid. In another aspect of this embodiment, the biodegradable material is applied to the substrate as a liquid and the biodegradable material forms a linked network on the substrate at a point subsequent to application of the biodegradable material to the substrate (for example, after the addition of the linking agent). Any of the biodegradable materials of the first to fifth aspects may be used in combination with the substrate. In such an embodiment, polymer 1 and polymer 2 of the biodegradable material are preferably applied to the substrate sequentially. When the material comprises two or more layers, the functions of each layer may be the same, may be different, or the two or more layers may cooperatively interact to achieve the same function. Further, when the material comprises 5 or 7 layers, the biodegradable material comprises at least one layer of polymer A and one layer of polymer B and optionally additional layers of polymer A and B (wherein the number of layers of polymer A and B are not required to be equal to one another).

In any of the sixth to ninth embodiments, a single surface or face of the substrate may have the biodegradable material applied or more than 1 surface or face of the substrate may have the biodegradable material applied. In any of the sixth to ninth embodiments, the substrate may be a biodegradable substrate. In any of the sixth to ninth embodiments, the substrate may be a paper substrate. In any of the sixth to ninth embodiments, the substrate may be a three-dimensional substrate, such as for example, a cup or container, wherein the substrate is optionally biodegradable or wherein the substrate is paper.

In any of the sixth to ninth embodiments, the biodegradable material serves as an environmental barrier to prevent or reduce an environmental factor from contacting a product contained in a package comprising the biodegradable material of the present disclosure.

In any of the sixth to ninth embodiments, the biodegradable material serves as a water vapor barrier to prevent water vapor from contacting a product contained in a package comprising the biodegradable material of the present disclosure or to reduce the amount of water vapor that contacts a product contained in a package comprising the biodegradable material of the present disclosure.

In any of the sixth to ninth embodiments, the biodegradable material serves as an oxygen barrier to prevent oxygen from contacting a product contained in a package comprising the biodegradable material of the present disclosure or to reduce the amount of oxygen that contacts a product contained in a package comprising the biodegradable material of the present disclosure.

In any of the sixth to ninth embodiments, the biodegradable material serves as a water vapor and oxygen barrier to prevent water vapor and oxygen from contacting a product contained in a package comprising the biodegradable material of the present disclosure or to reduce the amount of water vapor and oxygen that contacts a product contained in a package comprising the biodegradable material of the present disclosure.

In a tenth embodiment, the present disclosure provides for a method of applying a biodegradable material of the present disclosure to a substrate, the method comprising the steps of: 1) applying a mixture of polymer 1 and polymer 2 to a substrate; 2) optionally incubating the substrate for a period of time; and 3) contacting the substrate with a linking agent. Such method may further comprise incubating the substrate to allow the biodegradable material to form a linked network and/or curing the substrate to aid in the formation of the linked network. In one aspect of this embodiment, the biodegradable material may further comprises a plasticizer. In another aspect of this embodiment, the biodegradable material may further comprise at least one of a plasticizer and a stabilizer. In another aspect of this embodiment, the biodegradable material may further comprise at least one of a plasticizer, a surfactant, and a stabilizer. In another aspect of this embodiment, the biodegradable material may further comprise at least one of a plasticizer, a surfactant, a stabilizer, and a preservative. In any of the foregoing aspects, the biodegradable material (for example, the polymer 1/polymer 2 mixture or any other component thereof) may be applied to the substrate in a liquid form.

In an eleventh embodiment, the present disclosure provides for a method of applying a biodegradable material of the present disclosure, the method comprising the steps of: 1) applying a first polymer to a substrate; 2) optionally incubating the substrate for a period of time (for example to allow for drying); 3) optionally contacting the first polymer on the substrate with a linking agent; 4) optionally incubating the substrate for a period of time (for example to allow for drying); 5) applying second polymer to the substrate; 6) optionally incubating the substrate for a period of time (for example to allow for drying); and 7) optionally contacting the second polymer on the substrate with a linking agent, provided that a linking agent is added at either step 3 or step 7. Such method may further comprise incubating the substrate to allow the biodegradable material to form a linked network and/or curing the substrate to aid in the formation of the linked network. In certain embodiments, the first polymer is polymer 1 as described herein and the second polymer is polymer 2 as described herein. In certain embodiments, the first polymer is polymer 2 as described herein and the second polymer is polymer 1 as described herein. In one aspect of this embodiment, the biodegradable material may further comprises a plasticizer. In another aspect of this embodiment, the biodegradable material may further comprise at least one of a plasticizer and a stabilizer. In another aspect of this embodiment, the biodegradable material may further comprise at least one of a plasticizer, a surfactant, and a stabilizer. In another aspect of this embodiment, the biodegradable material may further comprise at least one of a plasticizer, a surfactant, a stabilizer, and a preservative. Such a method may further comprise additional steps of further applying additional amounts of the first polymer (such as by repeating steps 1-2 or 1-4) and/or further applying additional amounts of the second polymer (such as by repeating steps 5-6 or 5-7) In any of the foregoing, the first polymer may be applied to the substrate in a liquid form, the second polymer may be applied to the substrate in a liquid form, and/or the linking agent may be applied to the substrate in a liquid form.

In a twelfth embodiment, the present disclosure provides for a method of applying a biodegradable material of the present disclosure, the method comprising the steps of: 1) applying a first polymer to a substrate; 2) optionally incubating the substrate for a period of time (for example to allow for drying); 3) optionally contacting the first polymer on the substrate with a linking agent; 4) optionally incubating the substrate for a period of time (for example to allow for drying); 5) applying second polymer to the substrate; 6) optionally incubating the substrate for a period of time (for example to allow for drying); 7) optionally contacting the second polymer on the substrate with a linking agent; 8) applying an additional amount of the first polymer or the second polymer to the substrate; 9) optionally incubating the substrate for a period of time (for example to allow for drying); 10) optionally contacting the first polymer on the substrate with a linking agent, provided that a linking agent is added at either step 3 step 6, or step 10. Such method may further comprising adding additional amounts of polymer 1 and/or 2 by repeating steps 8-10. Such method may further comprise incubating the substrate to allow the biodegradable material to form a linked network and/or curing the substrate to aid in the formation of the linked network. In certain embodiments, the first polymer is polymer 1 as described herein and the second polymer is polymer 2 as described herein. In certain embodiments, the first polymer is polymer 2 as described herein and the second polymer is polymer 1 as described herein. In one aspect of this embodiment, the biodegradable material may further comprises a plasticizer. In another aspect of this embodiment, the biodegradable material may further comprise at least one of a plasticizer and a stabilizer. In another aspect of this embodiment, the biodegradable material may further comprise at least one of a plasticizer, a surfactant, and a stabilizer. In another aspect of this embodiment, the biodegradable material may further comprise at least one of a plasticizer, a surfactant, a stabilizer, and a preservative. Such a method may further comprise additional steps of further applying additional amounts of the first polymer (such as by repeating steps 1-2 or 1-4) and/or further applying additional amounts of the second polymer (such as by repeating steps 5-6 or 5-7) In any of the foregoing, the first polymer may be applied to the substrate in a liquid form, the second polymer may be applied to the substrate in a liquid form, and/or the linking agent may be applied to the substrate in a liquid form.

In one aspect of the tenth embodiment, the polymer 1/polymer 2 mixture may be applied to the substrate in a liquid form (for example, preparing a solution of polymer 1 and polymer 2 in a common, suitable solvent). In another aspect of the tenth embodiment, the polymer 1/polymer 2 mixture may be applied to the substrate through spraying or spray drying. In another aspect of the tenth embodiment, the polymer 1/polymer 2 mixture may be applied to the substrate through extrusion coating. In another aspect of the tenth embodiment, the polymer 1/polymer 2 mixture may be applied to the substrate through coating. In another aspect of the tenth embodiment, the polymer 1/polymer 2 mixture may be applied to the substrate through gravure coating. In another aspect of the tenth embodiment, the polymer 1/polymer 2 mixture may be applied to the substrate through extrusion laminating.

In any of the foregoing eleventh to twelfth embodiments, the first and second polymers may be applied to the substrate in a liquid form (for example, preparing a solution of the first polymer in a suitable solvent and preparing a solution of the second polymer in a suitable solvent). In any of the foregoing eleventh to twelfth embodiments, the first and second polymers may be applied to the substrate through spraying or spray drying. In any of the foregoing eleventh to twelfth embodiments, the first and second polymers may be applied to the substrate through coating. In any of the foregoing eleventh to twelfth embodiments, the first and second polymers may be applied to the substrate through gravure coating. In any of the foregoing eleventh to twelfth embodiments, the first and second polymers may be applied to the substrate through extrusion coating. In any of the foregoing eleventh to twelfth embodiments, the first and second polymers may be applied to the substrate through extrusion laminating.

In any of the foregoing eleventh to twelfth embodiments, the first and second polymers may be applied to the substrate by a single method or by more than 1 method. In any of the foregoing eleventh to twelfth embodiments, the first and second polymers are applied to the substrate by a single method.

In a thirteenth embodiment, the present disclosure provides a kit for producing a biodegradable material of the present disclosure, the kit comprising an amount of polymer 1, and an amount of polymer 2, and optionally, an amount of one or more of a linking agent, a plasticizer, a stabilizer, a preservative, and surfactant. In one aspect of this embodiment, the kit comprises an amount of polymer 1, an amount of polymer 2, an amount of a linking agent, an amount of a plasticizer, and an amount of a stabilizer. In any of the foregoing, the kit may further comprise one or more of instructions for formulating the biodegradable material, instructions for applying the components of the kit to a substrate, a substrate, and a solvent for solubilizing one or more of the components of the kit.

In a fourteenth embodiment, the present disclosure provides a substrate comprising a biodegradable material of the present disclosure. The biodegradable material may be any material described in the first to fifth embodiments or the sixth through ninth embodiments. Such substrate comprising the biodegradable material may be manufactured using a method of any one of the methods described in the tenth to twelfth embodiments. Such substrate may be manufactured using a kit as described in the thirteenth embodiment.

DETAILED DESCRIPTION

General Description

All illustrations of the drawings are for the purpose of describing selected versions of the present disclosure and are not intended to limit the scope of the present disclosure.

Figure 1:
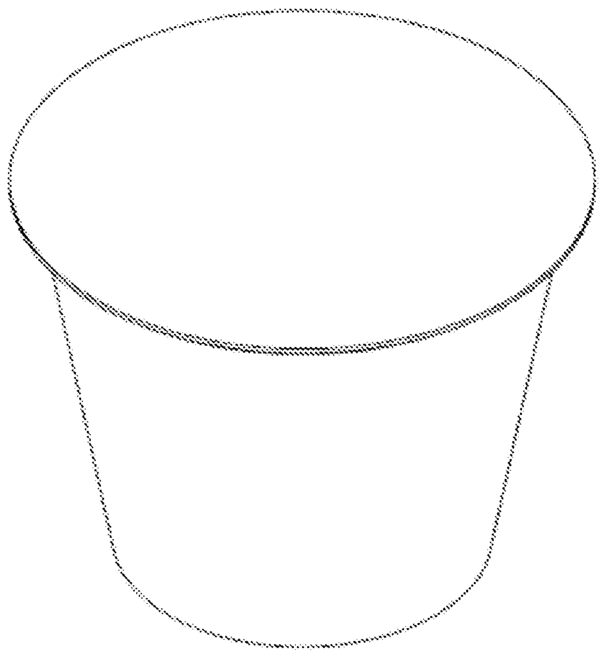
FIG. 1 is a perspective view of a coffee pod comprising the biodegradable material of the present disclosure.
Figure 2:
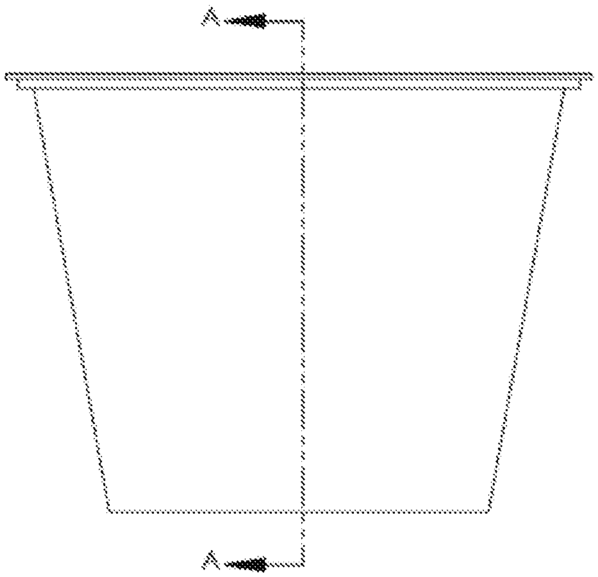
FIG. 2 is a front view of the coffee pod.
Figure 3:
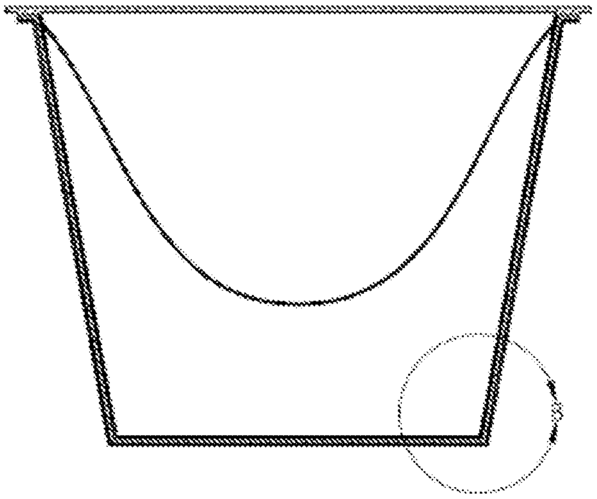
FIG. 3 is a cross-sectional view taken along the line A-A in FIG. 2.
Figure 4:
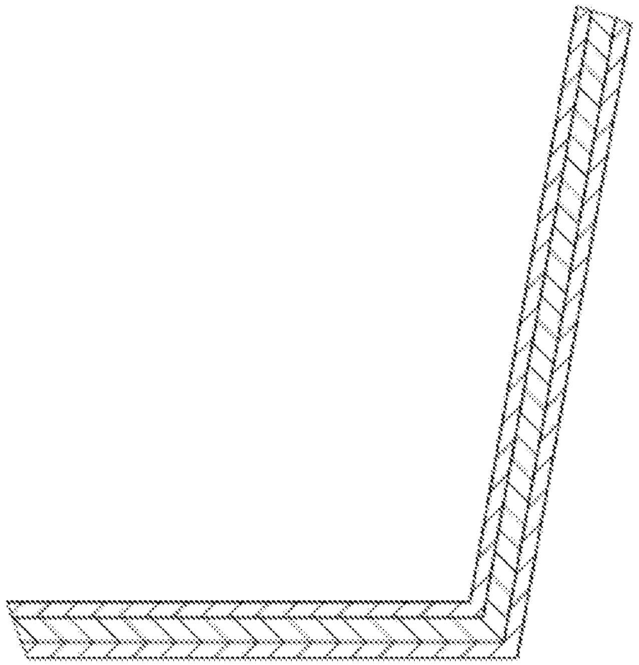
FIG. 4 is a partially enlarged view of FIG. 3.

In reference to FIGS. 1-4, the present disclosure provides a biodegradable material that can be used in the packaging of various products. In certain embodiments, the biodegradable material is used in the food industry to package various food products. In certain embodiments, the biodegradable material is applied as a coating to a substrate that forms the packaging. In certain embodiments, the biodegradable material forms the packaging for the product. In certain embodiments, the biodegradable material forms a portion of the packaging.

The biodegradable material described herein may be manufactured to comprise a single layer of two or more layers. The method of manufacturing may influence whether the biodegradable material forms a single layer of two or more layers. The biodegradable material may be applied to a single substrate or may be sandwiched between two substrates.

In one embodiment, the biodegradable material comprises the following components: i) a first polymer; ii) a second polymer; iii) a linking agent; and optionally one or more of iv) a plasticizer; v) a stabilizer; vi) a preservative; and vii) a surfactant. The various compounds that may be used in the biodegradable material are described herein. Preferably, the biodegradable material comprises only naturally occurring components. Preferably, the biodegradable material comprises only components that approved for use with food products.

As discussed above, the biodegradable material may comprise a single layer or two or more layers. When the biodegradable material comprises two or more layers, the functions of each layer may be the same, may be different, or the two or more layers may cooperatively interact to achieve the same function. Whether present as a single layer or two or more layers, polymer 1 and polymer 2 of the biodegradable material are linked by the linking agent. In certain embodiments, polymer 1 and polymer 2 are linked to create an interconnected network (i.e., a linked network) by the linking agent, wherein polymer 1 and polymer 2 are linked at multiple points along their polymer backbones.

In one embodiment, the biodegradable material is a single polymer layer comprising a linked network of polymer 1 and polymer 2. In certain aspects, the biodegradable material is applied to a substrate.

In another embodiment, the biodegradable material comprises two polymer layers. In one aspect of this embodiment, the biodegradable material may comprise a first layer of polymer 1 and a second layer of polymer 2, wherein the layers of polymer 1 and polymer 2 form a linked network. In certain aspects, the biodegradable material is applied to a substrate. In certain aspects, the biodegradable material is sandwiched between two substrates. Additional layers of polymer 1 and/or polymer 2 may be added as desired.

In another embodiment, the biodegradable material comprises two polymer layers. In one aspect of this embodiment, the biodegradable material may comprise a first layer of polymer 2 and a second layer of polymer 1, wherein the layers of polymer 1 and polymer 2 form a linked network. In certain aspects, the biodegradable material is applied to a substrate. In certain aspects, the biodegradable material is sandwiched between two substrates. Additional layers of polymer 1 and/or polymer 2 may be added as desired.

In another embodiment, the biodegradable material comprises three polymer layers. In one aspect of this embodiment, the biodegradable material may comprise a first layer of polymer 1, a second layer of polymer 2, and a third payer of polymer 1, wherein the layers of polymer 1 and polymer 2 form a linked network with one another. In certain aspects, the biodegradable material is applied to a substrate. In certain aspects, the biodegradable material is sandwiched between two substrates. Additional layers of polymer 1 and/or polymer 2 may be added as desired.

In another embodiment, the biodegradable material comprises three polymer layers. In one aspect of this embodiment, the biodegradable material may comprise a first layer of polymer 2, a second layer of polymer 1, and a third payer of polymer 2, wherein the layers of polymer 1 and polymer 2 form a linked network with one another. In certain aspects, the biodegradable material is applied to a substrate. In certain aspects, the biodegradable material is sandwiched between two substrates. Additional layers of polymer 1 and/or polymer 2 may be added as desired.

In another embodiment, the biodegradable material comprises more than 2 polymer layers. In one aspect of this embodiment, the biodegradable material further comprises an additional layer of polymer 1 and/or polymer 2. In certain aspects, the one of the additional layers forms a linked network with the first or second layer. In certain aspects, the biodegradable material is applied to a substrate. In certain aspects, the biodegradable material is sandwiched between two substrates.

The biodegradable material of the present disclosure serves as an environmental barrier to prevent or reduce an environmental factor from contacting a product contained in a package comprising the biodegradable material of the present disclosure. In a preferred use, the product is a food product. Environmental factors include, but are not limited to, water vapor and oxygen.

In one embodiment the biodegradable material of the present disclosure serves as a water vapor barrier to prevent water vapor from contacting a product contained in a package comprising the biodegradable material of the present disclosure or to reduce the amount of water vapor that contacts a product contained in a package comprising the biodegradable material of the present disclosure. In a preferred use, the product is a food product.

In another embodiment the biodegradable material of the present disclosure serves as an oxygen barrier to prevent oxygen from contacting a product contained in a package comprising the biodegradable material of the present disclosure or to reduce the amount of oxygen that contacts a product contained in a package comprising the biodegradable material of the present disclosure. In a preferred use, the product is a food product.

In another embodiment the biodegradable material of the present disclosure serves as a water vapor and oxygen barrier to prevent water vapor and oxygen from contacting a product contained in a package comprising the biodegradable material of the present disclosure or to reduce the amount of water vapor and oxygen that contacts a product contained in a package comprising the biodegradable material of the present disclosure. In a preferred use, the product is a food product.

It is an aim of the present disclosure to provide a biodegradable material for use in packaging that can be readily manufactured by spray drying, spraying, coating, lamination, casting, and other methods. In certain embodiments, the biodegradable material is applied to a substrate. It is another aim of the present disclosure to provide a biodegradable material for use in packaging that has the appropriate characteristics to come into contact with a variety of food substances. It is another aim of the present disclosure to provide a biodegradable material for use in packaging as a substitute for plastics to at least alleviate the waste disposal problems associated with the use of plastics.

FIGS. 1-4 illustrate a coffee pod which is made from the biodegradable material of the present disclosure. In one embodiment, a method of manufacturing the coffee pod may comprise the following steps: forming an HPMC cup via injection molding; then applying an oxygen barrier coating and a moisture barrier coating onto the outer wall and inner wall of the HPMC cup, respectively; attaching a filter to the cup; and covering the cup with a cover after ground coffee is placed in the cup. Preferably, the cover is also made from the biodegradable material of the present disclosure.

In an alternate embodiment, a method of manufacturing the coffee pod may comprise the following steps: forming a cup from a suitable substrate, for example a paper substrate; then applying the biodegradable material of the present disclosure to at least one of the outer walls or the inner walls of the cup to provide an environmental barrier for protection of the product contained in the cup (for example, to provide a water vapor barrier, an oxygen barrier, or both a water vapor and an oxygen barrier); and attaching a filter to the cup; and covering the cup with a cover after ground coffee is placed in the cup. Preferably, the cover also incorporates the biodegradable material of the present disclosure (whether applied to a single substrate or sandwiched between two substrates).

In a further alternate embodiment, a method of manufacturing the coffee pod may comprise the following steps: forming a cup from a suitable substrate, for example a paper substrate; then applying the biodegradable material of the present disclosure to at least one of the outer walls or the inner walls of the cup to provide an environmental barrier for protection of the product contained in the cup (for example, to provide a water vapor barrier, an oxygen barrier, or both a water vapor and an oxygen barrier); applying an additional substrate to the biodegradable material of the present disclosure (whether the biodegradable material is on the inside and/or outside of the cup) and attaching a filter to the cup; and covering the cup with a cover after ground coffee is placed in the cup. Preferably, the cover also incorporates the biodegradable material of the present disclosure (whether applied to a single substrate or sandwiched between two substrates).

Although the compositions and methods has been explained in relation to its preferred embodiment, it is to be understood that many other possible modifications and variations can be made without departing from the spirit and scope of the compositions and methods disclosed herein.

Definitions

All patent applications, patents, and printed publications which are cited to be incorporated by reference are incorporated herein by reference in the entireties (unless specifically noted), except for any definitions, subject matter disclaimers or disavowals, and except to the extent that the incorporated material is inconsistent with the express disclosure herein, in which case the language in this disclosure controls.

The term "biodegradable" and "biodegradation" as used herein refers to a material that is capable of being broken down (decomposed) by the environment, including, but not limited to, through the action of microorganisms and exposure to other environmental conditions. In a particular embodiment, in the case of a single use item that comprises a biodegradable material of the present disclosure, the material is capable of being broken down (decomposed) by the environment after the single use item has been used for its intended purpose. The term "biodegradable" means no special conditions are required for decomposition of the biodegradable material and/or no segregation/isolation of the biodegradable material from other waster products is required for decomposition.

The term "cellulose" as used herein refers to a polysaccharide consisting of a linear chain of β(1→4) linked D-glucose units having the structure:

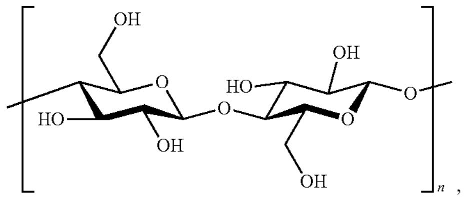

where n is from 50 to 8,000.

The term "cellulose ether" as used herein refers to a cellulose derivative in which a hydroxyl group the cellulose has been replaced with a substituent group. Suitable substituent groups include, but are not limited to, $—[CH_2CH(CH_3)O]_fH$, $—[CH_2CH(CH_3)O]_fCH_3$, -[(alkylene)O]H, $—[CH_2C(O)O]_dH$, $—C(O)CH_3$, $—C(O)CH_2CH_2C(O)OH$, $—[CH_2CH(CH_3)O]_yH$, $—[CH_2CH(CH_3)O]_yCH_3$, $—[CH_2CH(CH_3)O]C(O)CH_3$, or $—[CH_2CH(CH_3)O]C(O)CH_2CH_2C(O)OH$.

The term "compostable" as used herein refers to a material that is capable of disintegrating into natural elements in a compost environment, leaving no toxicity in the soil after the material is disintegrated. In a particular embodiment, the term "compostable" indicates the material is in compliance with ASTM D6400 or ASTM D6868 standards. A compostable material requires segregation from other water materials.

The term "food product" as used herein means products in any form (solid, granular, powdered, ground, gel, liquid, or solid) intended for human consumption or used to generate a product intended for human consumption, including, but not limited to, beverages, coffee or coffee products, milk or milk products, meat or meat products, poultry or poultry products, fish or fish products, seafood or seafood products, cider or juice, acidified foods, fruits, and vegetables.

The term "heterogeneous substitution or "heterogeneously substituted" as used herein to describe a polymer refers to a substitution pattern where two or more adjacent subunits on the polymer have the same degree of substitution. For example, with reference to an HPMC polymer, a heterogeneous substitution pattern is shown below:  where the color white indicates the monomer is not substituted, the hatched pattern indicates the monomer is mono-substituted, and the black color indicates the monomer is di- or tri-substituted.

The term "homogeneous substitution or "homogeneously substituted" as used herein to describe a polymer refers to a substitution pattern where no two adjacent subunits on the polymer have the same degree of substitution. For example, with reference to an HPMC polymer, a homogeneous substitution pattern is shown below:   where the color white indicates the monomer is not substituted, the hatched pattern indicates the monomer is mono-substituted, and the black color indicates the monomer is di- or tri-substituted.

The terms "polysaccharide" or "polysaccharide polymer" as used herein refer to naturally occurring polysaccharides as well as polysaccharides that are obtained via chemical modification of a naturally occurring polysaccharide, chemical synthesis, or genetic engineering. The terms are used to include both linear and branched polysaccharides. Further, the terms are used to include oligosaccharides and longer saccharide polymers, wherein the individual monomeric saccharide units may be naturally occurring or modified. Modified saccharides include those wherein one or more of the hydroxyl groups are replaced with a substituent containing a negative charge, such as, but not limited to, a carboxylic acid group, a phosphate group, or a sulfate group. In certain embodiments, the negative charge is masked (i.e., the modified saccharide/polysaccharide is present masked as a salt) and the modified saccharide displays the negative charge when the polysaccharide containing the modified saccharide is placed in a solution for use, such as, but not limited, to an aqueous solution. The individual monosaccharide units may be linked via α or β linkages and may be in the D or L configuration or the (R) or (S) configuration. Intersugar linkages within the polysaccharide polymer may be α-1,2, α-1,3, α-1,4, α-1,6, β-1,2, β-1,3, β-1,4, β-1,6 linkages, or other linkages known in the art.

The term "predominantly" as used herein, particularly in reference to a polymer, means at least 80%, at least 90%, at least 95%, or at least 99% of the polysaccharide shares the recited characteristic. For example, if a polysaccharide polymer is described as having predominately β-(1-4) and α-(1-4) intersugar linkages, then at least 80% (including 100%) of the intersugar linkages of such polysaccharide are β-(1-4) or α-(1-4) intersugar linkages.

The term "uronic acid" as used herein means a sugar (including a sugar that is part of a polysaccharide) in which the terminal carbon's hydroxyl group has been oxidized to a carboxylic acid group ($—COO^-$) (i.e., the carboxylic acid group is not part of the sugar ring structure making the carboxylic group more available to form a linkage with an additional compound); a uronic acid may also be referred to as a sugar acid.

Biodegradable Material

The biodegradable material of the present disclosure generally comprises i) a first polymer, ii) a second polymer and iii) a linking agent. The biodegradable material may further comprise one or more of iv) a plasticizer; v) a stabilizer; vi) a preservative; and vii) a surfactant. The various compounds that may be used in the biodegradable material are described herein. In one aspect of this embodiment, the biodegradable material is applied to a substrate in the form of a liquid. In another aspect of this embodiment, the biodegradable material is applied to a substrate in the form of a liquid and the biodegradable material is converted to a solid or a semi-solid linked network at a point subsequent to the application to the substrate (such as at a point after the addition of the linking agent).

In one embodiment, the biodegradable material comprises two polymer components, polymer 1 and polymer 2, a linking agent, a plasticizer and optionally one or more of a surfactant, a stabilizer and a preservative. In one aspect of this embodiment, the biodegradable material is applied to a substrate in the form of a liquid. In another aspect of this embodiment, the biodegradable material is applied to a substrate in the form of a liquid and the biodegradable material is converted to a solid or a semi-solid linked network at a point subsequent to the application to the substrate (such as at a point after the addition of the linking agent).

In another embodiment, the biodegradable material comprises two polymer components, polymer 1 and polymer 2, a linking agent, a plasticizer, a stabilizer and optionally one or more of a surfactant and a preservative. In one aspect of this embodiment, the biodegradable material is applied to a substrate in the form of a liquid. In another aspect of this embodiment, the biodegradable material is applied to a substrate in the form of a liquid and the biodegradable material is converted to a solid or a semi-solid linked network at a point subsequent to the application to the substrate (such as at a point after the addition of the linking agent).

In another embodiment, the material comprises two polymer components, polymer 1 and polymer 2, a linking agent, a plasticizer, a preservative, a stabilizer and optionally a surfactant. In one aspect of this embodiment, the biodegradable material is applied to a substrate in the form of a liquid. In another aspect of this embodiment, the biodegradable material is applied to a substrate in the form of a liquid and the biodegradable material is converted to a solid or a semi-solid linked network at a point subsequent to the application to the substrate (such as at a point after the addition of the linking agent).

Preferably, the biodegradable material comprises only naturally occurring components. Preferably, the biodegradable material comprises only components that approved for use with food products.

In certain embodiments, the biodegradable material does not contain hyaluronic acid or hyaluronic acid derivatives, chitosan or chitosan derivatives, or bentonite.

The biodegradable material may be produced to have a thickness as desired. It is preferred that the biodegradable material have a minimal thickness to minimize the use of raw materials while still achieving the function as an environmental barrier (i.e., a water vapor barrier and/or an oxygen barrier). The thickness of the material may be selected to provide a specific degree of protection for the product. In one aspect, the biodegradable material has a thickness required to provide an OTR (determined as described in the Examples section) of less than or equal to 100 $cc/m^2/day$, 75 $cc/m^2/day$, 50 $cc/m^2/day$, 25 $cc/m^2/day$, 20 $cc/m^2/day$, 15 $cc/m^2/day$, 10 $cc/m^2/day$, 5 $cc/m^2/day$, 3 $cc/m^2/day$, 2 $cc/m^2/day$, or 1 $cc/m^2/day$. In another aspect, the biodegradable material has a thickness from 2 to 500 μm. In another aspect, the biodegradable material has a thickness from 2 to 250 μm. In another aspect, the biodegradable material has a thickness from 2 to 100 μm. In another aspect, the biodegradable material has a thickness from 2 to 75 μm. In another aspect, the biodegradable material has a thickness from 2 to 50 μm. In another aspect, the biodegradable material has a thickness from 2 to 40 μm. In another aspect, the biodegradable material has a thickness from 2 to 30 μm. In another aspect, the biodegradable material has a thickness from 2 to 25 μm. In another aspect, the biodegradable material has a thickness from 2 to 20 μm. In another aspect, the biodegradable material has a thickness from 2 to 15 μm. In another aspect, the biodegradable material has a thickness from 2 to 10 μm.

As discussed herein, the present disclosure provides for a biodegradable material that can be used in packaging applications. In certain embodiments, the biodegradable material does not require any special conditions for decomposition. In certain embodiments, the biodegradable material does not require compositing. In certain embodiments, the biodegradable material will undergo biodegradation in a landfill or in a body of water. In certain embodiments, the biodegradable material will show enhanced biodegradation after the biodegradable material is exposed to a condition required for use of the product contained in packaging comprising the biodegradable material (for example, for a single use coffee pod, the exposure of the biodegradable material to a heated liquid and/or a low pH environment). In certain embodiments, the biodegradable material is biodegradable within 365 days. In certain embodiments, the biodegradable material is biodegradable within 180 days. In certain embodiments, the biodegradable material is biodegradable within 120 days. In certain embodiments, the biodegradable material is biodegradable within 90 days. In certain embodiments, the biodegradable material is biodegradable within 60 days.

Polymer 1

A variety of polymer materials may be used as polymer 1. In one embodiment, polymer 1 is a biomass-derived polymer. In one embodiment, polymer 1 is a biomass-derived polymer which can be degraded into subunits of the biomass-derived polymer (such as polypeptide, amino acid, polysaccharides, or sugars). Examples of biomass-derived polymers include, but are not limited to, albumin (for example, egg albumin or milk albumin), wheat gluten, polymers from algae or bacteria, whey proteins (e.g., soy, nut, milk, etc.), or a prolamine protein (for example, corn zein). In one embodiment, polymer 1 is a polysaccharide polymer, or a salt or solvate thereof. In another embodiment, polymer 1 is a polysaccharide polymer, or a salt or solvate thereof, wherein one or more of the hydroxyl groups of a saccharide unit of the polysaccharide polymer has been modified to contain a negative charge.

In certain aspects of this embodiment, the polysaccharide polymer is a homopolymer comprising a single saccharide. In certain aspects of this embodiment, the polysaccharide polymer is a heteropolymer containing two or more different saccharides. When the polysaccharide polymer is a heteropolymer, suitable saccharides for us in the polymer include, but are not limited to, glucose, galactose, mannose, allose, altrose, idose, gulose, talose, ribose, arabinose, xylose, lyxose, in either the D or L configuration or the (R) or (S) configuration and including deoxy sugar variants and uronic acid variants of each of the foregoing. In certain aspects of this embodiment, the intersugar linkages may be α or β linkages or a mixture of α and β linkages. In certain aspects of this embodiment, the intersugar linkages are predominantly β-(1-4) and α-(1-4) linkages or α-(1-2) linkages.

In certain aspects of this embodiment, the polysaccharide polymer is a polysaccharide component from or derived from a natural source. In certain aspects of this embodiment, the polysaccharide polymer is a polysaccharide component from or derived from an algae. In certain aspects of this embodiment, the polysaccharide polymer is a polysaccharide component from or derived from an algae, wherein the polysaccharide component is a cell wall structural component of the algae. When the polysaccharide polymer is a polysaccharide component from or derived from an algae, the algae may be from the class Chlorophyta, Phaeophyta, or Rhodophyta. When the polysaccharide polymer is a polysaccharide component from or derived from an algae, the algae may be from the class Phaeophyta and the genus *Ascophyllum, Laminaria, Mycrocystis, Undaria*, or *Cladosiphon*. When the polysaccharide polymer is a polysaccharide component from or derived from an algae, the algae may be from the class Chlorophyta and the genus *Monostroma* or *Enteromorpha*. When the polysaccharide polymer is a polysaccharide component from or derived from an algae, the algae may be from the class Rhodophyta and the genus *Asparagopsis, Gelidiella, Gelidiopsis, Gelidium Gracilaria, Pterocladia, Chondrus, Eucheuma, Kappaphycus, Gigartina, Hypnea, Iridaea, Palmaria*, or *Porphyra*.

In one embodiment, polymer 1 is a polysaccharide polymer comprising a plurality of uronic acid subunits. In one aspect of this embodiment, the polysaccharide polymer comprises at least 50%, at least 60%, at least 70%, at least 80%, at least 90%, at least 95%, at least 98%, or at least 99% or more of uronic acid or a uronic acid derivative. Examples of uronic acids and uronic acid derivatives include, but are not limited to, D-glucuronic acid, D-galacturonic acid, D-mannuronic acid, D-alluronic acid, L-altruronic acid, D-guluronic acid, L-guluronic acid, L-iduronic acid, and D-taluronic acid. Preferred uronic acids include guluronic acid, mannuronic acid, glucuronic acid, and iduronic acid.

In one embodiment, polymer 1 is an alginic acid polysaccharide polymer, or a salt or solvate thereof (also referred to as algin or alginate). Alginic acid is a linear copolymer of (1-4)-linked β-D-mannuronate and its C-5 epimer α-L-guluronate residues, respectively, covalently linked together in different sequences or blocks. The monomer units can appear in blocks of consecutive guluronate residues (G-blocks), blocks of consecutive mannuronate residues (M-blocks) or blocks of alternating mannuronate residues and guluronate residues (MG-blocks).

The various forms of alginic acid are shown below. A G-block has the configuration formula IA below.

IA

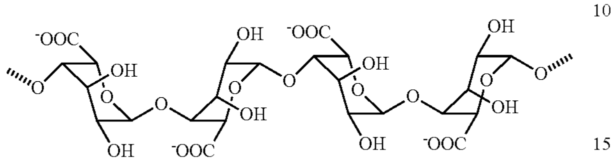

An M-block has the configuration formula IB below.

IB

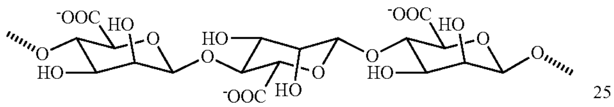

An MG-block (sequence MGMG) has the configuration formula IC below.

IC

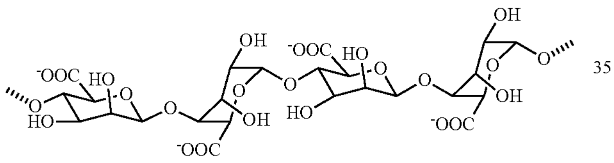

Alginic acid may also be represented the formula ID or a salt or solvate thereof:

ID

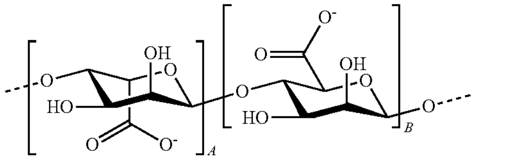

wherein A represents β-D-mannuronate residues and B represents α-L-guluronate residues, wherein A and B are each independently an integer from 50 to 4,000 (such as 50 to 3,100, 200 to 1550, or 400 to 1000) and the total of A and B is less than 5,000 (such as less than 4,000). A and B may be selected to provide for an alginic acid polymer comprising one or more G-blocks, one or more M-blocks, one or more MG-blocks, or any combination of the foregoing.

In certain aspects of this embodiment, alginic acid derived from a natural source. In nature, alginic acid exists as an acidic polysaccharide. Suitably, alginic acid is extracted from a brown algae. Suitably, alginic acid has a molecular weight between about 10,000 and 600,000 Da or higher, such as from 30,000 to 400,000 Da or 50,000 to 300,000 Da (each of the foregoing referring to number average molecular weight). Suitably, the alginic acid has a polydispersity index from 0.6 to 1.4. The degree of polymerization varies according to the type of alga used for extraction, the season in which the algae were gathered and the place of origin of the algae, as well as the age of the plant itself. In one aspect, the alginic acid is derived from an algae of the class Phaeophyta. In another aspect, the alginic acid is derived from an algae of the class Phaeophyta and the genus *Ascophyllum, Durvillea, Ecklonia, Fucus, Laminaria, Mycrocystis, Undaria*, or *Cladosiphon*. Species of brown algae used to obtain alginic acid are, for example, *Macrocystis pyrifera, Laminaria cloustoni, L. hyperborea, L. flexicaulis, L. digitata, L. japonica, Ascophyllum nodosum, Lessonia flavicans, Durvillea antartica, Ecklonia maxima* and *Fucus serratus*. Alginic acid may also be derived from bacterial sources, including, but not limited to, bacteria of the genera *Pseudomonas* and *Azotobacter*.

In a particular aspect, the alginic acid is obtained from a commercial source. In one aspect, the monomer units of the alginic acid polymer comprise at least 30%, at least 40%, at least 50%, at least 60%, at least 70%, at least 80%, or at least 90% or greater G-blocks, with the reminder comprising M-blocks and/or MG-blocks. In another aspect, the monomer units of the alginic acid polymer comprise from 30% to 90% G-blocks, from 30% to 70% G-blocks, from 40% to 70% G-blocks, from 30% to 50% G-blocks, or from 50% to 90% G-blocks, with the reminder comprising M-blocks and/or MG-blocks. Alginic acid extracted from the seaweeds *Laminaria hyperborea* and *Lessonia flavicans* are particularly rich in G-blocks.

In one aspect, the monomer units of the alginic acid polymer comprise at least 30%, at least 40%, at least 50%, at least 60%, at least 70%, at least 80%, or at least 90% or greater M-blocks, with the reminder comprising G-blocks and/or MG-blocks. In another aspect, the monomer units of the alginic acid polymer comprise from 30% to 90% M-blocks, from 30% to 70% M-blocks, from 40% to 70% M-blocks, from 30% to 50% M-blocks, or from 50% to 90% M-blocks, with the reminder comprising G-blocks and/or MG-blocks. Alginic acid extracted from the seaweeds *Laminaria japonica* and *Durvillea antartica* are particularly rich in M-blocks.

In one aspect, the monomer units of the alginic acid polymer comprises at least 20%, at least 30%, at least 40%, at least 50%, at least 60%, at least 70%, or at least 80% or greater MG-blocks, with the reminder comprising G-blocks and/or M-blocks. In another aspect, the monomer units of the alginic acid polymer comprises from 20% to 80% MG-blocks, from 20% to 70% MG-blocks, from 20% to 50% MG-blocks, from 20% to 40% MG-blocks, with the reminder comprising G-blocks and/or M-blocks. Alginic acid extracted from the seaweed *Ecklonia maxima* is particularly rich in MG-blocks.

Preferably, the alginic acid polymer contains more G subunits than M subunits. In one aspect, the alginic acid polymer has a G/M ratio of greater than or equal to 1, greater than or equal to 1.1, greater than or equal to 1.2, greater than or equal to 1.4, greater than or equal to 1.6, or greater than or equal to 1.8 (each of the foregoing being less than or equal to 2.5). In one aspect, 20% to 75%, such as but not limited to, 30%, 40%, 50%, 60%, and 70%, of the G subunits of the alginic acid polymer are present as GG blocks (including GG block diads). In one aspect, 20% to 60%, such as but not limited to, 30%, 40%, and 50%, are present as GG block diads.

In one aspect, alginic acid polymer is synthetically prepared to have a selected ratio of G-blocks to M-blocks to MG-blocks, G-blocks to M-blocks, G-blocks to MG-blocks, or M-blocks to GM-blocks. In another aspect, the alginic acid polymer is chemically modified from a natural source to have a selected ratio of G-blocks to M-blocks to MG-blocks, G-blocks to M-blocks, G-blocks to MG-blocks, or M-blocks to GM-blocks.

In one embodiment, polymer 1 is an ulvan polysaccharide polymer, or a salt or solvate thereof. Ulvan is a linear copolymer of (1-4)-linked β-D-mannuronate and its C-5 epimer α-L-guluronate residues, respectively, covalently linked together in different sequences or blocks. Ulvan is a sulfated heteropolysacharide comprising rhamnose 3-sulfate, xylose, xylose 2-sulfate, glucuronic acid and iduronic acid subunits. The four recurrent units are β(1-4) D-GlcA-α(1-4) L-Rha 3 sulfate, β(1-4)L-IdoA-α(1-4)-L-Rha 3 sulfate, β(1-4)-D-Xyl-α(1-4)-L-Rha 3 sulfate, and β(1-4) D-Xyl 2-sulfate-α(1-4)-L-Rha 3 sulfate. The chemical composition of ulvan can vary due to a variety of reasons including the species it is extracted from, geographical location and harvest. The marine polysaccharide is found in green algae and is commonly extracted from *Ulva pertusa* and *Ulva lactuca*.

The various forms of ulvan are shown below. The β(1-4) D-GlcA-α(1-4) L-Rha 3 sulfate disaccharide of ulvan is represented by formula IIA below.

IIA

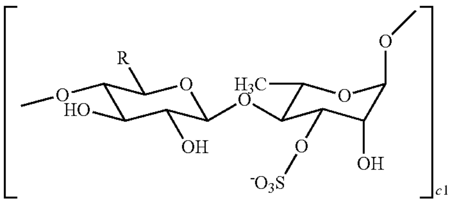

wherein R is independently for each repeating unit OH or $COO^-$ and c1 is an integer from 50 to 4,000.

The β(1-4)L-IdoA-α(1-4)-L-Rha 3 sulfate disaccharide of ulvan is represented by formula IIB below.

IIB

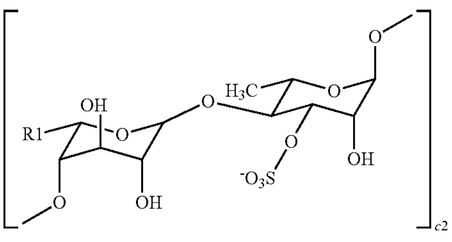

wherein $R_1$ is independently for each repeating unit OH or $COO^-$ and c2 is an integer from 50 to 4,000.

The β(1-4)-D-Xyl-α(1-4)-L-Rha 3 sulfate disaccharide of ulvan is represented by formula IIC below.

IIC

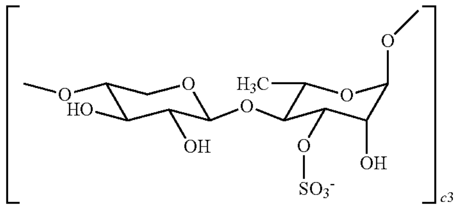

wherein c3 is an integer from 50 to 4,000.

The β(1-4) D-Xyl 2-sulfate-α(1-4)-L-Rha 3 sulfate disaccharide of ulvan is represented by formula IIA below.

IID

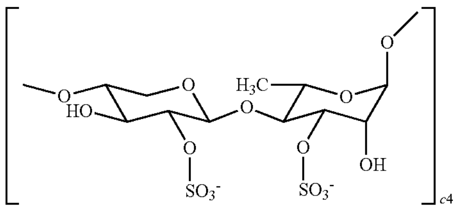

wherein c4 is an integer from 50 to 5,000.

In one aspect of this embodiment, the ulvan polymer comprises predominately a compound of the formula IIA and less or equal to 20% (such as less than or equal to 15%, 10%, 5%, or 1%) of a compound of the formula IIB, IIC, IID, or another sugar unit and the number of monomer units in the ulvan polymer is from 50 to 5,000. In a particular aspect of the compound of formula IIA, R is OH for at least 25%, at least 50%, at least 75%, or at least 90% of the disaccharide units present, with remainder being $COO^-$.

In one aspect of this embodiment, the ulvan polymer comprises predominately a compound of the formula IIB and less or equal to 20% (such as less than or equal to 15%, 10%, 5%, or 1%) of a compound of the formula IIA, IIC, IID, or another sugar unit. In a particular aspect of the compound of formula IIB, $R_1$ is OH for at least 25%, at least 50%, at least 75%, or at least 90% of the disaccharide units present, with the remainder being $COO^-$.

In one aspect of this embodiment, the ulvan polymer comprises predominately a compound of the formula IIC and less or equal to 20% (such as less than or equal to 15%, 10%, 5%, or 1%) of a compound of the formula IIA, IIB, IID, or another sugar unit.

In one aspect of this embodiment, the ulvan polymer comprises predominately a compound of the formula IID and less or equal to 20% (such as less than or equal to 15%, 10%, 5%, or 1%) of a compound of the formula IIA, IIB, IIC, or another sugar unit.

In one aspect, the ulvan polymer is polymer of the formula IIE

IIE

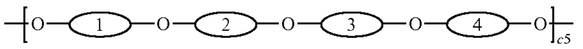

wherein: 1, 2, 3, and 4 are each independently for each repeating unit a disaccharide of the formula IIA, a disaccharide of the formula IIB, a disaccharide of the formula IIC, or a disaccharide of the formula IID;

The linkages between 1, 2, 3, and 4 are each β(1-4); and c5 is an integer from 10 to 5,000.

In certain aspects of the polymer of formula IIE, a disaccharide of the formula IIC represents less than 10% or less than 5% of the disaccharide units (by weight of the total polymer) or is absent. In certain aspects of the polymer of formula IIE, a disaccharide of the formula IID represents less than 10% or less than 5% of the disaccharide units (by weight of the total polymer) or is absent. In certain aspects of the polymer of formula IIE, a disaccharide of the formula IIC and IID represents together less than 10% or less than 5% of the disaccharide units (by weight of the total polymer) or are absent.

In certain aspects of the polymer of formula IIE, 1, 2, 3, and 4 are each independently for each repeating unit a disaccharide of the formula IIA, a disaccharide of the formula IIC, or a disaccharide of the formula IID. In certain aspects of the polymer of formula IIE, 1, 2, 3, and 4 are each independently for each repeating unit a disaccharide of the formula IIA, a disaccharide of the formula IIC, or a disaccharide of the formula IID and one of the following is true: i) a disaccharide of the formula IIC represents less than 10% or less than 5% of the disaccharide units (by weight of the total polymer) or is absent; ii) a disaccharide of the formula IID represents less than 10% or less than 5% of the disaccharide units (by weight of the total polymer) or is absent; or iii) a disaccharide of the formula IIC and IID represents together less than 10% or less than 5% of the disaccharide units (by weight of the total polymer) or are absent.

In certain aspects of the polymer of formula IIE, 1, 2, 3, and 4 are each independently for each repeating unit a disaccharide of the formula IIB, a disaccharide of the formula IIC, or a disaccharide of the formula IID. In certain aspects of the polymer of formula IIE, 1, 2, 3, and 4 are each independently for each repeating unit a disaccharide of the formula IIB, a disaccharide of the formula IIC, or a disaccharide of the formula IID and one of the following is true: i) a disaccharide of the formula IIC represents less than 10% or less than 5% of the disaccharide units (by weight of the total polymer) or is absent; ii) a disaccharide of the formula IID represents less than 10% or less than 5% of the disaccharide units (by weight of the total polymer) or is absent; or iii) a disaccharide of the formula IIC and IID represents together less than 10% or less than 5% of the disaccharide units (by weight of the total polymer) or are absent.

In certain aspects of the polymer of formula IIE, 1, 2, 3, and 4 are each independently for each repeating unit a disaccharide of the formula IIA or a disaccharide of the formula IIB. In certain aspects of the polymer of formula IIE, 1, 2, 3, and 4 are each independently for each repeating unit a disaccharide of the formula IIA or a disaccharide of the formula IIB and one of the following is true: i) a disaccharide of the formula IIA represents less than 10% or less than 5% of the disaccharide units (by weight of the total polymer) or is absent; ii) a disaccharide of the formula IIB represents less than 10% or less than 5% of the disaccharide units (by weight of the total polymer) or is absent.

In another embodiment, polymer 1 is a polymer comprising a saccharide of the formula III, or a salt or solvate thereof:

III

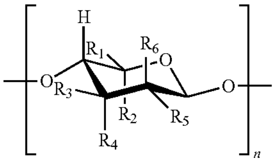

wherein:

for each repeating unit, one of $R_1$ and $R_2$ is independently COO— or $OSO_3$— and the other of $R_1$ and $R_2$ is H;

for each repeating unit, one of $R_3$ and $R_4$ is independently OH, COO— or $OSO_3$— and the other of $R_3$ and $R_4$ is H;

for each repeating unit, one of $R_5$ and $R_6$ is independently OH, COO— or $OSO_3$— and the other of $R_5$ and $R_6$ is H; and n is an integer from 50 to 8,000.

In certain aspects of this embodiment, each saccharide repeating unit contains 3 COO— or $OSO_3$— groups. In certain aspects of this embodiment, each saccharide repeating unit contains 2 COO— or $OSO_3$— groups. In certain aspects of this embodiment, each saccharide repeating unit contains a single COO— or $OSO_3$— group. In certain aspects of this embodiment, one of $R_1$ and $R_2$ is COO— or $OSO_3$— and the other of $R_1$ and $R_2$ is H for each saccharide repeating unit, one of $R_3$ and $R_4$ is OH and the other of $R_3$ and $R_4$ is H, and one of $R_5$ and $R_6$ is OH and the other of $R_5$ and $R_6$ is H. In certain aspects of this embodiment, one of $R_1$ and $R_2$ is COO— and the other of $R_1$ and $R_2$ is H for each saccharide repeating unit, one of $R_3$ and $R_4$ is OH and the other of $R_3$ and $R_4$ is H, and one of $R_5$ and $R_6$ is OH and the other of $R_5$ and $R_6$ is H.

In any of the aspects above, the intersugar linkages of the polymer may be α or β linkages only or a mixture of α and β linkages. In any of the aspects above, the intersugar linkages are predominantly β-(1-4), α-(1-4) linkages or a combination of β-(1-4) and α-(1-4) linkages.

In another embodiment, polymer 1 is a polymer comprising a saccharide of the formula IVA, or a salt or solvate thereof, and a saccharide of the formula IVB, or a salt or solvate thereof:

IVA

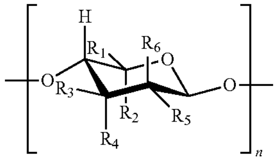

wherein:

for each repeating unit, one of $R_1$ and $R_2$ is $CH_3$ and the other of $R_1$ and $R_2$ is H;

for each repeating unit, one of $R_3$ and $R_4$ is independently $(CH_2)_xCOO$—, COO—, $(CH_2)_yOSO_3$—, $OSO_3$—, or OH and the other of $R_3$ and $R_4$ is H;

for each repeating unit, one of $R_5$ and $R_6$ is independently $(CH_2)_xCOO$—, COO—, $(CH_2)_yOSO_3$—, $OSO_3$—, or OH and the other of $R_5$ and $R_6$ is H;

x and y are each independently an integer from 1 to 6; and n is an integer from 50 to 8,000.

IVB

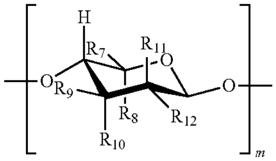

wherein:

for each repeating unit, one of $R_7$ and $R_8$ is independently $(CH_2)_aCOO$—, COO—, $(CH_2)_bOSO_3$—, or $OSO_3$— and the other of $R_7$ and $R_8$ is H;

for each repeating unit, one of $R_9$ and $R_{10}$ is independently $(CH_2)_aCOO$—, COO—, $(CH_2)_bOSO_3$—, or $OSO_3$— or OH and the other of $R_9$ and $R_{10}$ is H;

for each repeating unit, one of $R_{11}$ and $R_{12}$ is independently $(CH_2)_aCOO$—, COO—, $(CH_2)_bOSO_3$—, or $OSO_3$— or OH and the other of $R_{11}$ and $R_{12}$ is H;

a and b are each independently an integer from 1 to 6; and m is an integer from 50 to 8,000.

In another embodiment, polymer 1 is a polymer comprising a saccharide of the formula IVA, or a salt or solvate thereof, and a saccharide of the formula IVB, or a salt or solvate thereof:

IVA

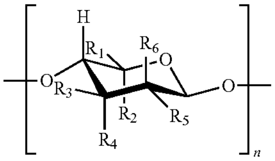

wherein:

for each repeating unit, one of $R_1$ and $R_2$ is $CH_3$ and the other of $R_1$ and $R_2$ is H;

for each repeating unit, one of $R_3$ and $R_4$ is independently $(CH_2)_xCOO$—, COO—, $(CH_2)_yOSO_3$—, $OSO_3$—, or OH and the other of $R_3$ and $R_4$ is H;

for each repeating unit, one of $R_5$ and $R_6$ is independently $(CH_2)_xCOO$—, COO—, $(CH_2)_yOSO_3$—, $OSO_3$—, or OH and the other of $R_5$ and $R_6$ is H;

x and y are each independently an integer from 1 to 6; and n is an integer from 50 to 8,000.

IVC

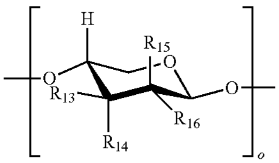

wherein:

for each repeating unit, one of $R_{13}$ and $R_{14}$ is independently OH or $OSO_3$— and the other of $R_{13}$ and $R_{14}$ is H;

for each repeating unit, one of $R_{15}$ and $R_{16}$ is independently OH and the other of $R_{15}$ and $R_{16}$ is H; and o is an integer from 50 to 8,000.

Polymer 2

A variety of polymer materials may be used as polymer 2. In one embodiment, polymer 1 is a biomass-derived polymer. In one embodiment, polymer 2 is a cellulose ether, or a salt or solvate thereof. Suitable cellulose ethers include, but are not limited to, hydroxypropyl methylcellulose (HPMC), hydroxypropyl cellulose (HPC), hydroxyethyl cellulose (HEC), carboxymethyl cellulose (CMC), and hydroxypropyl methylcellulose acetate succinate (HPMC-AS). The foregoing may be heterogeneously substituted or may be homogenously substituted.

In one embodiment, polymer 2 is not a cellulose nanocrystal, a cellulose nano whisker, (meth)acrylic acid, (meth) acrylonitrile, (meth)acrylamide, vinyl acetate, vinyl pyrrolidone, vinyl pyridine, maleic acid or anhydride, itaconic acid or anhydride, fumaric acid, vinyl sulfonic acid, 2-acrylamido-2-methylpropane sulfonic acid, and the amides, the N-alkyl derivatives, the N,N'-dialkyl derivatives, the hydroxyl group-containing esters, and the amino group-containing esters of said subunits, microfibrillated cellulose, nanofibrillated cellulose, birch pulp derivate, nanofibrillated anionic dicarboxylic acid cellulose, paper fibers, or combinations of the foregoing.

In another embodiment, polymer 2 has the formula V, or salt or solvate thereof:

V

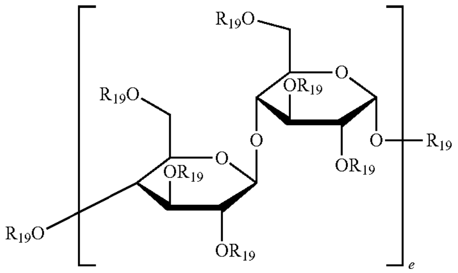

wherein $R_{19}$ is independently for each occurrence —H, —$CH_3$, —$[CH_2CH(CH_3)O]_fH$, —$[CH_2CH(CH_3)O]_fCH_3$, -[(alkylene)O]H, —$[CH_2C(O)O]_dH$, —C(O)$CH_3$, —C(O)$CH_2CH_2$C(O)OH, or —$[CH_2CH(CH_3)O]_fR_{19a}$;

$R_{19a}$ is independently for each occurrence —H, —$CH_3$, —C(O)$CH_3$, or —C(O)$CH_2CH_2$C(O)OH alkylene is a C1 to C6 unsubstituted alkylene chain or a C1 to C6 substituted alkylene chain, where the alkylene chain is substituted by one to three —$CH_3$, —$CH_2CH_3$, —CH($CH_3$)$CH_3$, or —$CH_2CH_2CH_3$ groups;

d is independently for each subunit an integer from 1 to 6;

f is independently for each subunit an integer from 1 to 6; and e is an integer from 50 to 8,000.

In one aspect of this embodiment, polymer 2 is a polymer of formula V, wherein $R_{19}$ is independently for each occurrence —H, —$CH_3$, —$[CH_2CH(CH_3)O]_fH$, or —$[CH_2CH(CH_3)O]_fCH_3$. The percentage of methoxy and hydroxypropyl substitution may vary as is known in the art. A suitable range for methoxy substitution is between 15 to 35%, specifically including 27 to 30%, 19 to 24%, 22 to 27%, and 16.5 to 20%. A suitable range for hydroxypropyl substitution is between 2 to 16%, specifically including 4 to 7.5%, 4 to 12%, and 7 to 12%. In certain aspects, polymer 2 has a methoxy substitution of 27 to 30% and a hydroxypropyl substitution of 4 to 7.5%, a methoxy substitution of 28 to 30% and a hydroxypropyl substitution of 7 to 12%, a methoxy substitution of 19 to 24% and a hydroxypropyl substitution of 4 to 12%, or a methoxy substitution of 22 to 24% and a hydroxypropyl substitution of 7 to 12%. The polymer may be heterogeneously substituted or may be homogenously substituted. In the above, the % substitutions refer to % substitution by weight of the polymer.

In one aspect of this embodiment, polymer 2 is a polymer of formula V, wherein $R_{19}$ is independently for each occurrence —H, —$CH_3$, $C(O)CH_3$, —$C(O)CH_2CH_2C(O)OH$, or —$[CH_2CH(CH_3)O]_fR_{19a}$, where $R_{19a}$ is independently for each occurrence —H, —$CH_3$, —$C(O)CH_3$, or —$C(O)CH_2CH_2C(O)OH$. The percentage of methoxy, hydroxypropyl, acetyl, and succinoyl substitution may vary as is known in the art. A suitable range for methoxy substitution is between 18 to 30%, specifically including 20 to 24%, 21 to 25%, and 22 to 26%. A suitable range for hydroxypropyl substitution is between 4 to 13%, specifically including 5 to 9% and 6 to 10%. A suitable range for acetyl substitution is between 3 to 18%, specifically including 5 to 9%, 7 to 11%, and 10 to 14%. A suitable range for succinoyl substitution is between 2 to 22%, specifically including 4 to 8%, 10 to 14%, and 14 to 18%. In certain aspects, polymer 2 has a methoxy substitution of 20 to 24%, a hydroxypropyl substitution of 5 to 9%, an acetyl substitution of 5 to 9%, and a succinoyl substitution of 14 to 18%. In certain aspects, polymer 2 has a methoxy substitution of 21 to 25%, a hydroxypropyl substitution of 5 to 9%, an acetyl substitution of 7 to 11%, and a succinoyl substitution of 10 to 14%. In certain aspects, polymer 2 has a methoxy substitution of 22 to 26%, a hydroxypropyl substitution of 6 to 10%, an acetyl substitution of 10 to 14%, and a succinoyl substitution of 4 to 8%. In the above, the % substitutions refer to % substitution by weight of the polymer.

In one aspect of this embodiment, polymer 2 is a polymer of formula V, wherein $R_{19}$ is independently for each occurrence —H or —$[CH_2CH(CH_3)O]_fH$. The hydroxypropyl residue may be present with a degree of substitution of each subunit of 0 to 3.0, such as, but not limited to 2.0 to 2.5 or 1.5 to 2.5. The polymer may be heterogeneously substituted or may be homogenously substituted.

In one aspect of this embodiment, polymer 2 is a polymer of formula V, wherein $R_{19}$ is independently for each occurrence —H or —$[CH_2CH_2O]_fH$. The hydroxyethyl residue may be present with a degree of substitution of each subunit of 0 to 4.0, such as, but not limited to 2.0 to 3.0 or 2.0 to 2.5. The polymer may be heterogeneously substituted or may be homogenously substituted.

In one aspect of this embodiment, polymer 2 is a polymer of formula V, wherein $R_{19}$ is independently for each occurrence —H or —$CH_2C(O)OH$. The carboxymethyl residue may be present with a degree of substitution of each subunit of 0 to 3.0, such as, but not limited to 2.0 to 2.5 or 1.5 to 2.5. The polymer may be heterogeneously substituted or may be homogenously substituted.

In certain preferred aspects of any of the foregoing, d is an integer from 1 to 3 or is 1 or 2. In certain preferred aspects of any of the foregoing, f is an integer from 1 to 3 or 1.

In certain preferred aspects of any of the foregoing, polymer 2 is approved for contact with food and/or beverage products.

Linking Agent

As discussed herein, polymer 1 and polymer 2 form linkages with one another after the linking agent is added. A variety of linking agents may be used to form linkages between polymer 1 and polymer 2. The choice of a suitable linking agent may depend, at least in part, on the nature of the groups present on polymer 1 and/or polymer 2. In one embodiment, the linking agent has low or no toxicity. In another embodiment, the linking agent is approved or suitable for contact with food products.

In certain embodiments, polymer 1 and polymer 2 are linked to create a linked network by the linking agent, wherein polymer 1 and polymer 2 are linked at multiple points along their polymer backbones.

In certain embodiments, the linkages comprise one or more covalent bonds. In certain embodiments, the linkages do not form one or more covalent bonds. In certain embodiments, the linkages comprise one or more ionic bonds. In certain embodiments, the linkages comprise one or more coordinate bonds.

In one embodiment, the linking agent is an ionic linking agent. In certain embodiments, the linking agent is a cationic linking agent. Suitable cationic linking agents include both divalent and trivalent cations. Suitable divalent cations include, but are not limited to, Barium ($Ba^{+2}$), Beryllium ($Be^{+2}$), Cadmium ($Cd^{+2}$), Calcium ($Ca^{+2}$), Cobalt ($Co^{+2}$), Copper ($Cu^{+2}$), Gallium ($Ga^{+2}$), Iron ($Fe^{+2}$), Lead ($Pb^{+2}$), Magnesium ($Mg^{+2}$), Mercury ($Hg^{+2}$), Polonium ($Po^{+2}$), Radium ($Ra^{+2}$), Titanium ($Ti^{+2}$), Uranyl ($UO_2^{+2}$), Ytterbium ($Yb^{+2}$), and Zinc ($Zn^{+2}$). Suitable trivalent cations include, but are not limited to, Aluminum ($Al^{+3}$), Antimony ($Sb^{+3}$), Bismuth ($Bi^{+3}$), Cobalt ($Co^{+3}$), Gallium ($Ga^{+3}$), Gold ($Au^{+3}$), Iron ($Fe^{+3}$), Scandium ($Sc^{+3}$), Titanium ($Ti^{+3}$), Ytterbium ($Yb^{+3}$), and Yttrium ($Y^{+3}$). Cations with a +4. +5, or +6 charge may also be used.

Preferred cationic linking agents are calcium, copper, aluminum, iron, and chromium. A particularly preferred cationic linking agent is calcium. It has been reporting that certain polymers (for example alginate and cellulose ether like HPMC) have different reactivity toward divalent and trivalent cations. Therefore, in certain methods, two or more different cationic linking agents are used. When two different cationic linking agents are used, preferred cationic linking agents are calcium and aluminum.

Without being bound by any particular theory, the linking agent (particularly a cationic linking agent) is believed to a common binding point for polymer 1 and polymer 2, wherein a single linking agent forms a linkage with one or more groups of polymer 1 and polymer 2.

Plasticizer

As described herein, the biodegradable material of the present disclosure may comprise one or more plasticizers. Any plasticizer known in the art for use with the polymers described herein, particularly polysaccharide polymers, may be used. In one embodiment, the plasticizer has low or no toxicity. In another embodiment, the plasticizer is approved or suitable for contact with food products.

Suitable plasticizers include, but are not limited to, triglyceride vegetable oils (for example, from soybean oil, linseed oil, castor-oil, sunflower oil), epoxidized triglyceride vegetable oils (for example, from soybean oil, linseed oil, castor-oil, sunflower oil), fatty acid esters, polyols, glycerol, ethylene glycol (EG), diethylene glycol (DEG), triethylene glycol (TEG), tetraethylene glycol, polyethylene glycol (PEG), ethanolamine (EA), urea, triethanolamine (TEA), vegetable oils, lecithin, and water.

In one embodiment, the plasticizer is selected with solubility parameters close to those of the polymers with which it is used. In another embodiment, the plasticizer is selected to be water soluble.

A preferred plasticizer is glycerol, a compound of the formula VI and triglyceride vegetable oils.

In one embodiment, the plasticizer has the formula VI:

VI

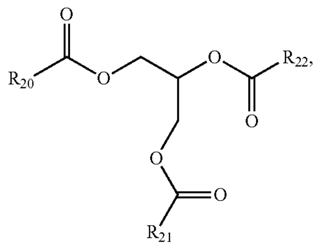

Wherein $R_{20}$, $R_{21}$, and $R_{22}$ are each independently a C10 to C18 saturated or unsaturated alkyl chain.

In certain embodiments, at least one of $R_{20}$, $R_{21}$, and $R_{22}$ contain from 1 to 4 double bonds (either in the cis or trans configuration). In certain embodiments, at least one of $R_{20}$, $R_{21}$, and $R_{22}$ contain from 2 to 3 double bonds (either in the cis or trans configuration).

In certain embodiments, each of $R_{20}$, $R_{21}$, and $R_{22}$ contain from 1 to 4 double bonds (either in the cis or trans configuration). In certain embodiments, each of $R_{20}$, $R_{21}$, and $R_{22}$ contain from 2 to 3 double bonds (either in the cis or trans configuration).

When one or more double bonds are present in one or more of $R_{20}$, $R_{21}$, and $R_{22}$, the double bonds are not required to be in the same position in each of $R_{20}$, $R_{21}$, and $R_{22}$ and the number of double bonds in $R_{20}$, $R_{21}$, and $R_{22}$ may vary. For example, $R_{20}$ may be an unsaturated C16 alkyl chain with 2 double bonds at the 9 and 12 positions (counting from the carbonyl carbon) and $R_{21}$ and $R_{22}$ may be a C16 alkyl chain with 3 double bonds at the 9, 12, and 15 positions (counting from the carbonyl carbon).

In certain embodiments, none of $R_{20}$, $R_{21}$, and $R_{22}$ contain a double bond.

In certain embodiments, a plasticizer may also act, at least partially, as a surfactant.

Multiple plasticizer compounds of the formula VI may be used as described herein.

In one embodiment, a preferred compound of the formula VI is a compound of formula VIA shown below:

Without being bound to any particular theory, the plasticizer is believed to improve the workability, flexibility and/or processability of the disclosed polymer combinations and to increase the efficiency with which polymers 1 and 2 are linked to one another.

Stabilizer

As described herein, the biodegradable material of the present disclosure may comprise one or more stabilizers. Any stabilizer known in the art for use with the polymers described herein, particularly polysaccharide polymers, may be used. In one embodiment, the stabilizer has low or no toxicity. In another embodiment, the stabilizer is approved or suitable for contact with food products.

In one embodiment, the stabilizer is a polysaccharide (in certain embodiments, the stabilizer is not a polysaccharide described as useful for polymer 1 or polymer 2). In another embodiment, the stabilizer is polysaccharide comprising a repeating unit of glucose, mannose, and glucuronic acid subunits. In another embodiment, the stabilizer is polysaccharide comprising a repeating unit of glucose, mannose, and glucuronic acid subunits in a 2:2:1 ratio. In another embodiment, the stabilizer is polysaccharide comprising a pentasaccharide repeating unit of glucose, mannose, and glucuronic acid subunits in a 2:2:1 ratio (such a polysaccharide is commonly known as xanthan gum).

In one embodiment, the pentasaccharide repeat is two glucose units linked β-(1-4), where every alternate glucose reside has a three sugar side chain consisting of two mannose residues with a glucuronic acid residue positioned between the mannose residues. The mannose reside nearest the main chain may be substituted at the C6 position with an acetyl group (—OC(O)$CH_3$) and the terminal mannose can may be substituted with a pyruvate group between the oxygen atoms at the C4 and C6 positions [($CH_3$)(COOH)C(O)(O)]. The acetylation and pyruvylation levels vary depending on fermentation conditions. In one embodiment, a pyruvate residue is found on 30-40% of the terminal mannose residues and an acetyl group is found on 60-70% of the internal mannose residues.

VIA

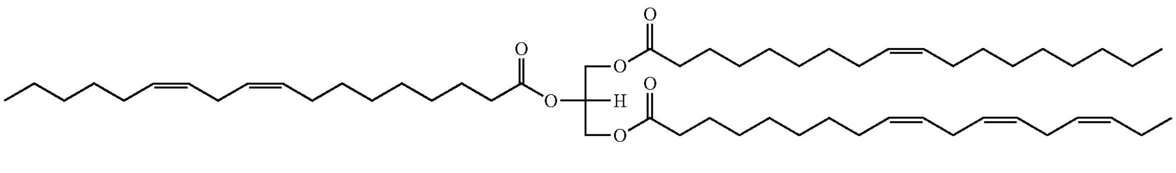

In one embodiment, the stabilizer is a compound of formula VII, or a salt or solvate thereof:

VII

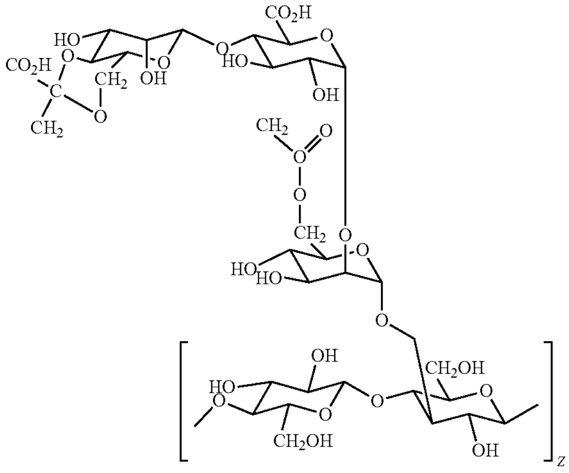

Wherein z is an integer from 25 to 4000.

Preservative

As described herein, the biodegradable material of the present disclosure may comprise one or more preservatives. Any preservative known in the art for use with the polymers described herein, particularly polysaccharide polymers, may be used. In one embodiment, the preservative has low or no toxicity. In another embodiment, the preservative is approved or suitable for contact with food products.

In one embodiment, the preservative is an anti-microbial agent and/or anti-viral agent. In one embodiment, the preservative includes, but is not limited to, a quaternary ammonium cation (QACs or QUATs), a tocopherol (vitamin E, including, but not limited to, d-alpha, d-beta, d-gamma, and d-delta tocopherol), a tocotrienol, a diol, an essential oil, a calcium phosphate, a sorbic acid, an ascorbic acid, a sodium benzoate, and an acid. In one embodiment, the preservative includes, but is not limited to, a QAC, and an essential oil.

QACs are organic compounds that contain at least one hydrophobic alkyl chain (in one embodiment, C2 to C20) attached to a positively charged central nitrogen atom. QACs may be divided into several groups, such as alkyl or hydroxyl (straight chain) substituted QACs, non-halogenated benzyl substituted QACs (including hydroxybenzyl, hydroxyethylbenzyl, naphylmethyl, dodecyhlbenzhyl, and alkyl benzyl), di- and tri-chlorobenzyl substituted QACs, and QACs with unusual substituents (charged heterocyclic compounds). Representative QACs include, but are not limited to, benzalkonium chloride, benzethonium chloride, methylbenzethonium chloride, cetalkonium chloride, cetylpyridinium, chloride, cetrimonium, cetrimide, dofanium chloride, tetraethylammonium bromide, didecyldimethylammonium chloride and domiphenbromide, didecyldimethylammonium chloride, alkyl dimethyl benzyl ammonium chloride (with alkyl groups of 8-18 carbons), and choline.

Essential oils and other components may be separated from plants through processes such as extraction (liquid-liquid extraction, solid-phase extraction, supercritical fluid extraction, pressurized liquid extraction, microwave-assisted extraction, and ultrasound-assisted extraction), distillation, and cold pressing (Burt, S. et al., Int J Food Microbiol 94:223-253, 2004; Rasooli, I, Food 1:111-136, 2007; Garcia-Salas et al., Molecules 15:8813-8826, 2010). Of these, steam distillation is the most commonly employed commercial method for extraction of essential oils (van de Braak and Leijten, Essential oils and oleoresins: a survey in the Netherlands and other major markets in the European Union. CBI, Centre for the Promotion of Imports from Developing Countries, Rotterdam, p 116, 1999).

Essential oils suitable for use herein include, but are not limited to, essential oils isolated from star anise, clove, thyme, hyssop, ginger, chamomile, and sandalwood, tea tree, cypress, juniper, tropical basil, peppermint, marjoram, eucalyptus, ravensara, lavender, lemon, rosemary, lemongrass, eucalyptus manuka oregano, ginger, *Lippia alba, L. graveolens L. citriodora, Oreganum vulgare, Artemisia vulgaris, Laurus nobilis, Thuja orientalis, Juniperus oxycedrus, Pistacia palaestina* and zataria (*Lamiaceae* species).

When present, the QAC may also serve as a linking agent as described herein. In certain embodiments, when the QAC is present the concentration of the linking agent may be decreased by an equivalent amount or less of the QAC added. Furthermore, when present essential oils may serve as a plasticizer. In certain embodiments, when an essential is present the concentration of plasticizer may be decreased by an equivalent amount or less of the essential oil added.

Preferred Biodegradable Compositions

In one embodiment, a preferred biodegradable material of the present disclosure comprises alginic acid, or a salt or solvate thereof, and a cellulose ether, or a salt of solvate thereof.

In another embodiment, a preferred biodegradable material of the present disclosure comprises alginic acid, or a salt or solvate thereof, a cellulose ether, or a salt of solvate thereof, and at least one divalent and/or trivalent cation.

In another embodiment, a preferred biodegradable material of the present disclosure comprises alginic acid, or a salt or solvate thereof, a cellulose ether, or a salt of solvate thereof, at least one divalent and/or trivalent cation, and glycerol.

In another embodiment, a preferred biodegradable material of the present disclosure comprises alginic acid, or a salt or solvate thereof, a cellulose ether, or a salt of solvate thereof, at least one divalent and/or trivalent cation, glycerol and xanthan gum.

In another embodiment, a preferred biodegradable material of the present disclosure comprises alginic acid, or a salt or solvate thereof, a cellulose ether, or a salt of solvate thereof, at least one divalent and/or trivalent cation, glycerol, xanthan gum, and a triglyceride vegetable oil or a compound of formula VIA.

In any of the foregoing embodiments, the cellulose ether may be HPMC. In any of the foregoing, embodiments, the cellulose ether may be HPMC having a methoxy substitution of 15 to 35%, specifically including 27 to 30%, 19 to 24%, 22 to 27%, and 16.5 to 20% and a hydroxypropyl substitution of 2 to 16%, specifically including 4 to 7.5%, 4 to 12%, and 7 to 12%. In any of the foregoing embodiments, the cellulose ether may be HPMC having a methoxy substitution of 27-30% and a hydroxypropyl substitution of 4 to 7.5%, a methoxy substitution of 28 to 30% and a hydroxypropyl substitution of 7 to 12%, a methoxy substitution of 19 to 24% and a hydroxypropyl substitution of 4 to 12%, or a methoxy substitution of 22 to 24% and a hydroxypropyl substitution of 7 to 12%. The polymer may be heterogeneously substituted or may be homogenously substituted.

In any of the foregoing embodiments, the cellulose ether may be HPMC-AS. In any of the foregoing embodiments, the cellulose ether may be HPMC-AS having a methoxy substitution of 18 to 30%, specifically including 20 to 24%, 21 to 25%, and 22 to 26%, hydroxypropyl substitution of 4 to 13%, specifically including 5 to 9% and 6 to 10%, an acetyl substitution of 3 to 18%, specifically including 5 to 9%, 7 to 11%, and 10 to 14%, and a succinoyl substitution of 2 to 22%, specifically including 4 to 8%, 10 to 14%, and 14 to 18%.

In any of the foregoing embodiments, the cellulose ether may be HPC. In any of the foregoing embodiments, the cellulose ether may be HPC, wherein the hydroxypropyl residue may be present with a degree of substitution of each subunit of 0 to 3.0, such as, but not limited to 2.0 to 2.5 or 1.5 to 2.5. The polymer may be heterogeneously substituted or may be homogenously substituted.

In any of the foregoing embodiments, the cellulose ether may be HEC. In any of the foregoing embodiments, the cellulose ether may be HEC, wherein the hydroxyethyl residue may be present with a degree of substitution of each subunit of 0 to 4.0, such as, but not limited to 2.0 to 3.0 or 2.0 to 2.5. The polymer may be heterogeneously substituted or may be homogenously substituted.

In any of the foregoing embodiments, the cellulose ether may be CMC. In any of the foregoing embodiments, the cellulose ether may be CMC, wherein the carboxymethyl residue may be present with a degree of substitution of each subunit of 0 to 3.0, such as, but not limited to 2.0 to 2.5 or 1.5 to 2.5. The polymer may be heterogeneously substituted or may be homogenously substituted.

In any of the foregoing embodiments, the cellulose ether is preferably HPMC as describe above.

In any of the foregoing, the divalent and/or trivalent cation may be calcium, copper, aluminum, iron, and/or chromium, or a salt of any of the foregoing. In any of the foregoing, the divalent cation is calcium, or a salt thereof.

In any of the foregoing, the biodegradable material comprises one layer of alginic acid polymer and one layer of cellulose ether polymer, preferably HPMC.

In any of the foregoing, the biodegradable material comprises one layer of alginic acid polymer and two layers of cellulose ether polymer, preferably HPMC. In any of the foregoing, the biodegradable material comprises one layer of alginic acid polymer and two layers of cellulose ether polymer, preferably HPMC, wherein the alginic acid polymer layer is sandwiched between the two cellulose ether polymer layers.

In any of the foregoing, the biodegradable material comprises two layers of alginic acid polymer and one layer of cellulose ether polymer, preferably HPMC. In any of the foregoing, the biodegradable material comprises two layers of alginic acid polymer and one layer of cellulose ether polymer, preferably HPMC, wherein the cellulose ether polymer layer is sandwiched between the two alginic acid polymer layers.

In any of the foregoing, the biodegradable material is applied to a single face of a substrate. In any of the foregoing, the biodegradable material is applied to more than one face of a substrate. In any of the foregoing, the biodegradable material is sandwiched between two substrates.

In any of the foregoing embodiments, the biodegradable material is prepared in a liquid form. In any of the foregoing embodiments, the biodegradable material is prepared in a liquid form, wherein the alginic acid polymer is prepared in a liquid solution, the cellulose ether (preferably HPMC) is prepared in a liquid solution, and the divalent/trivalent cation is prepared in a liquid solution. In any of the foregoing embodiments, the biodegradable material is prepared in a liquid form, wherein the alginic acid polymer is prepared in a liquid solution, the cellulose ether (preferably HPMC) is prepared in a liquid solution, and the divalent/trivalent cation is prepared in a liquid solution and at least one of the alginic acid polymer solution, the cellulose ether (preferably HPMC) polymer solution, and the divalent/trivalent linking solution further comprise a plasticizer, a stabilizer or both a plasticizer and a stabilizer.

In any of the foregoing embodiments, the biodegradable material is prepared in a liquid form, wherein the alginic acid polymer is prepared in a liquid solution, the cellulose ether (preferably HPMC) is prepared in a liquid solution, and the divalent/trivalent cation is prepared in a liquid solution and the cellulose ether (preferably HPMC) polymer solution further comprises the stabilizer (preferably a xanthan gum) and the divalent/trivalent linking solution further comprise the plasticizer (preferably glycerol).

In any of the foregoing embodiments, the components of the biodegradable material may be present in the following concentrations:

1. Alginic acid polymer: from 0.1 to 10%, such as, but not limited to, 1 to 5%, from 1 to 3%, or from 1 to 2;
2. Cellulose ether (preferably HPMC): from 0.1 to 10%, such as, but not limited to, 2 to 10%, from 2 to 7%, 1 to 5%, or 1 to 2%;
3. Plasticizer (preferably glycerol): from 0.1 to 15%, such as, but not limited to, 0.1 to 3%, 1 to 5%, 1 to 10%, or 2 to 7%;
4. Stabilizer (preferably xanthan gum): from 0.01 to 5%, such as, but not limited to, 0.1 to 5%, 0.1 to 2%, or 0.1 to 1%; and
5. Linking agent (preferably calcium): from 0.1 to 50%, such as, but not limited to, 1 to 25%, 1 to 10%, or 1 to 5%.

The foregoing values are provided as wt/volume of the solvent.

Amount of Components

In the compositions and methods described herein, the various components may be used in a variety of concentrations and amounts. The concentrations and amounts described below are exemplary and are not meant to exclude other concentrations or amounts.

The ratio of polymer 1 to polymer 2 in the compositions and methods described herein may vary. In one embodiment, the ratio is from 10:1 to 1:10 (pol 1:pol 2). In another embodiment, the ratio is from 5:1 to 1:5 (pol 1:pol 2). In another embodiment, the ratio is from 1:2 to 1:6 (pol 1:pol 2). In another embodiment, the ratio is from 1:4 to 1:6 (pol 1:pol 2). In another embodiment, the ratio is from 2:1 to 4:1 (pol 1:pol 2). In another embodiment, the ratio is from 1:1 (pol 1:pol 2). In certain preferred embodiments, a greater amount of polymer 2 is used in the methods described herein. The above ratios are applicable to molar ratios and weight to volume ratios.

Polymer 1 may be used in the methods described herein from 0.1 to 10% (wt/volume solvent). In certain embodiments, polymer 1 is used from 1 to 5% (wt/volume solvent), from 1 to 3% (wt/volume solvent), or from 1 to 2 (wt/volume solvent).

Polymer 2 may be used in the methods described herein from 0.1 to 10% (wt/volume solvent). In certain embodiments, polymer 2 is used from 2 to 10% (wt/volume solvent), from 2 to 7% (wt/volume solvent), from 1 to 5% (wt/volume solvent), or from 1 to 2% (wt/volume solvent).

The plasticizer may be used in the methods described herein from 0.1 to 15% (wt/volume solvent). In certain embodiments, the plasticizer is used from 0.1 to 3% (wt/volume solvent), from 1 to 5% (wt/volume solvent), from 1 to 10% (wt/volume solvent) or from 2 to 7% (wt/volume solvent).

The stabilizer may be used in the methods described herein from 0.01 to 5% (wt/volume solvent). In certain embodiments, the plasticizer is used from 0.1 to 5% (wt/volume solvent), from 0.1 to 2% (wt/volume solvent) or from 0.1 to 1% (wt/volume solvent).

The preservative may be used in the methods described herein from 0.1 to 15% (wt/volume solvent). In certain embodiments, the preservative is used from 0.1 to 10% (wt/volume solvent), from 0.1 to 7% (wt/volume solvent), from 0.1 to 5% (wt/volume solvent) or from 0.1 to 2% (wt/volume solvent).

The surfactant may be used in the methods described herein from 0.01 to 5% (wt/volume solvent). In certain embodiments, the surfactant is used from 0.1 to 5% (wt/volume solvent), from 0.1 to 2% (wt/volume solvent) or from 0.1 to 1% (wt/volume solvent).

The linking agent may be used at concentrations known in the art. While a minimum concentration or amount of linking agent is required, an excess of linking agent may be used without detrimental effects on the biodegradable material disclosed. In one embodiment, the linking agent is used in the methods described herein from 0.1 to 50% (wt/volume solvent). In certain embodiments, the linking agent is used from 1 to 25% (wt/volume solvent), from 1 to 10% (wt/volume solvent) or from 1 to 5% (wt/volume solvent). In one embodiment, the linking agent is used in the methods described herein at a concentration of 0.01M to 50M, In another embodiment, the linking agent is used in the methods described herein at a concentration of 0.01M to 10M, 0.01M to 5M, or 0.1M to 2.5M.

It is understood that the above ranges reflect the concentration of the various components in solution and do not reflect the concentration of the components in the biodegradable material.

Substrate

The substrate may be any substrate commonly used in the packaging industry. In one embodiment, the substrate is a paper substrate. In another embodiment, the substrate is a plastic substrate. In another embodiment, the substrate is a polymer substrate (such as, but not limited to, poly(lactic) acid or polyvinyl acetate). In certain embodiments, the substrate provides structural support to the biodegradable material of the present disclosure. In certain embodiments, the substrate provides a functional characteristic, such as providing a hydrophobic or hydrophilic component, which complements the biodegradable material of the present disclosure. In certain embodiments, the biodegradable material of the present disclosure is sandwich between to substrates (which substrates may be the same or may be different). When the substrate is a polymer substrate, the substrate may be the same as polymer 1 or polymer 2 or different from both polymer 1 and polymer 2. In preferred embodiments, the substrate is approved for contact with food products and optionally adheres to EU Framework Regulation EC 1935/2004 and/or 21 CFR 176.

Any of the biodegradable materials described herein may be applied to a substrate. Further, the biodegradable material may be applied to the substrate using any of the methods described herein. When a biodegradable material of the present disclosure is applied to a substrate, the biodegradable material may be applied to a single surface or face of the substrate or to more than one surface or face of the substrate. When a biodegradable material of the present disclosure is applied to more than one surface or face of a substrate, the biodegradable material applied to the one or more surfaces or faces may be the same or different.

The substrate may be a three-dimensional substrate, such as for example, a cup or container, or the substrate may be a two-dimensional substrate, such as for example, a sheet. In certain embodiments, a biodegradable material of the present disclosure is applied to a two-dimensional substrate and the two-dimensional substrate is formed into a three-dimensional object after the biodegradable material has been applied to the two-dimensional substrate.

The biodegradable material of the present disclosure when applied to a substrate serves as an environmental barrier to prevent or reduce an environmental factor from contacting a product contained in packaging manufactured from the substrate comprising the biodegradable material. In a preferred use, the product is a food product. Environmental factors include, but are not limited to, water vapor and oxygen.

In one embodiment the biodegradable material of the present disclosure when applied to a substrate serves as a water vapor barrier to prevent water vapor from contacting a product contained in packaging manufactured from the substrate comprising the biodegradable material or to reduce the amount of water vapor that contacts a product contained in packaging manufactured from the substrate comprising the biodegradable material. In a preferred use, the product is a food product.

In another embodiment the biodegradable material of the present disclosure when applied to a substrate serves as an oxygen barrier to prevent oxygen from contacting a product contained in packaging manufactured from the substrate comprising the biodegradable material or to reduce the amount of oxygen that contacts a product contained in packaging manufactured from the substrate comprising the biodegradable material. In a preferred use, the product is a food product.

In another embodiment the biodegradable material of the present disclosure when applied to a substrate serves as a water vapor and oxygen barrier to prevent water vapor and oxygen from contacting a product contained in packaging manufactured from the substrate comprising the biodegradable material or to reduce the amount of water vapor and oxygen that contacts a product contained in packaging manufactured from the substrate comprising the biodegradable material. In a preferred use, the product is a food product.

In any of the foregoing, it is preferred the substrate be biodegradable.

Methods of Applying a Biodegradable Material to a Substrate

The present disclosure also provides for methods of applying a biodegradable material of the present disclosure to a substrate.

In general, any method of applying a polymer composition to a substrate, particularly a polysaccharide polymer composition, may be used to apply a biodegradable material of the present disclosure to a substrate. The methods provided herein are exemplary in nature and are not intended to limit the application of the disclosed biodegradable material to the methods described.

In one embodiment, the present disclosure provides for a method of applying a biodegradable material of the present disclosure to a substrate, the method comprising the steps of: 1) applying a mixture of polymer 1 and polymer 2 to a substrate; 2) optionally incubating the substrate for a period of time; and 3) contacting the substrate with a linking agent.

Such method may further comprise one or more of the following steps after step 3): i) incubating the substrate to allow the biodegradable material to form a linked network and/or curing the substrate to aid in the formation of the linked network; and ii) curing the substrate (for example, ultraviolet curing) to aid in the formation of the linked network.

In one aspect of this method, the biodegradable material may further comprises a plasticizer. In another aspect of this method, the biodegradable material may further comprise at least one of a plasticizer and a stabilizer. In another aspect of this method, the biodegradable material may further comprise at least one of a plasticizer, a surfactant, and a stabilizer. In another aspect of this method, the biodegradable material may further comprise at least one of a plasticizer, a surfactant, a stabilizer, and a preservative.

After the polymer 1/polymer 2 mixture is applied to the substrate, the substrate may be incubated for a period of time before the polymer 1/polymer 2 mixture is contacted with the linking agent. In certain aspects, the polymer 1/polymer 2 mixture on the substrate is not allowed to dry completely. The period of time may be from 1 minute to 4 hours at a desired temperature. Suitable temperatures range from 10° C. to room temperature or from room temperature to 150° C. or higher (i.e., below the melting temperature for the polymer 1/polymer 2 mixture). In certain aspects, the substrate is incubated at room temperature for 1 to 30 minutes. In certain aspects, the substrate is incubated at room temperature for 1 to 60 minutes. In certain aspects, the substrate is incubated at 70-80° C. for 1 to 30 minutes or 1 to 60 minutes. In certain aspects, the substrate is incubated at room temperature for 1 to 30 minutes or 1 to 60 minutes.

In certain embodiments, step 2) is included and the substrate is incubated for 1 to 60 minutes at a temperature of room temperature to 150° C. In certain embodiments, step 2) is included and the substrate is incubated for 1 to 60 minutes at a temperature of room temperature to 80° C.

In certain aspects, the linking agent is a divalent cation as described herein (for example, calcium added as calcium chloride). In certain aspects, the linking agent is a trivalent cation as described herein (for example, aluminum added as aluminum chloride). In certain aspects, two linking agents are used wherein one linking agent is a divalent cation (for example, calcium added as calcium chloride) and one linking agent is a trivalent cation (for example, aluminum added as aluminum chloride).

In one aspect of this method, the polymer 1/polymer 2 mixture may be applied to the substrate in a liquid form, the linking agent may be applied in a liquid form, or the polymer 1/polymer 2 mixture may be applied to the substrate in a liquid form and the linking agent may be applied in a liquid form.

When the polymer 1/polymer two mixture is applied in a liquid form, a solution of polymer 1 and polymer 2 may be prepared by solubilizing polymer 1 and polymer 2 is a first solvent and the linking agent is a second solvent. The choice of first and second solvents may depend on the nature of polymer 1, the nature of polymer 2, the nature of the linking agent and/or the nature of the additional ingredients. The first and second solvents are preferably selected to be compatible with food products. In certain preferred embodiments, the first and second solvents water, such as for example, deionized (DI) water. In certain preferred embodiments, the first and second solvents are water, such as for example, deionized (DI) water, and at least one of the first and second solvents contains an azeotrope (such as, but not limited to a binary azeotrope) to aid in the removal of water when the biodegradable material is applied in a liquid form. Suitable azeotropes include, but are not limited to, ethanol, n-propanol, iso-propanol, n-butanol, sec-butanol, iso-butanol, tert-butanol, allyl alcohol, benzyl alcohol, furfuryl alcohol, dilute organic acids, dilute mineral acids, ethyl acetate, methyl acetate, n-propyl acetate, and ethyl nitrate.

In another embodiment, the present disclosure provides for a method of applying a biodegradable material of the present disclosure to a substrate, the method comprising the steps of: 1) applying a first polymer to a substrate; 2) optionally incubating the substrate for a period of time (for example to allow for drying); 3) optionally contacting the first polymer on the substrate with a linking agent; 4) optionally incubating the substrate for a period of time (for example to allow for drying); 5) applying second polymer to the substrate; 6) optionally incubating the substrate for a period of time (for example to allow for drying); and 7) optionally contacting the second polymer on the substrate with a linking agent, provided that a linking agent is added at either step 3 or step 7 (or each of steps 3 and 7).

Such a method may further comprise additional steps of further applying additional amounts of the first polymer (such as by repeating steps 1-2 or 1-4) and/or further applying additional amounts of the second polymer (such as by repeating steps 5-6 or 5-7).

Such method may further comprise one or more of the following steps after step 7): i) incubating the substrate to allow the biodegradable material to form a linked network and/or curing the substrate to aid in the formation of the linked network; and ii) curing the substrate (for example, ultraviolet curing) to aid in the formation of the linked network.

In one aspect of this method, the biodegradable material may further comprises a plasticizer. In another aspect of this method, the biodegradable material may further comprise at least one of a plasticizer and a stabilizer. In another aspect of this method, the biodegradable material may further comprise at least one of a plasticizer, a surfactant, and a stabilizer. In another aspect of this method, the biodegradable material may further comprise at least one of a plasticizer, a surfactant, a stabilizer, and a preservative.

After polymer 1 is applied to the substrate or after polymer 2 has been applied to the substrate comprising polymer 1, the substrate may be incubated for a period of time before additional steps are carried out. In certain aspects, polymer 1 on the substrate is not allowed to dry completely. In certain aspects, polymer 2 on the substrate comprising polymer 1 is not allowed to dry. In certain aspects, polymer 2 on the substrate comprising polymer 1 is allowed to dry completely. The period of time may be from 1 minute to 4 hours at a desired temperature. Suitable temperatures range from 10° C. to room temperature or from room temperature to 150° C. or higher (i.e., below the melting temperature for the polymer 1 and polymer 2). In certain aspects, the substrate is incubated at room temperature for 1 to 30 minutes. In certain aspects, the substrate is incubated at room temperature for 1 to 60 minutes. In certain aspects, the substrate is incubated at 70-80° C. for 1 to 30 minutes or 1 to 60 minutes. In certain aspects, the substrate is incubated at room temperature for 1 to 30 minutes or 1 to 60 minutes.

In certain embodiments, step 2) is included and the substrate is incubated for 1 to 60 minutes at a temperature of room temperature to 150° C. In certain embodiments, step 2) is included and the substrate is incubated for 1 to 60 minutes at a temperature of room temperature to 80° C.

In certain embodiments, step 4) is included and the substrate is incubated for 1 to 60 minutes at a temperature of room temperature to 150° C. In certain embodiments, step 4) is included and the substrate is incubated for 1 to 60 minutes at a temperature of room temperature to 80° C.

In certain embodiments, step 6) is included and the substrate is incubated for 1 to 60 minutes at a temperature of room temperature to 150° C. In certain embodiments, step 6) is included and the substrate is incubated for 1 to 60 minutes at a temperature of room temperature to 80° C.

In certain embodiments, steps 2), 4), and 6) are included and the substrate is incubated for 1 to 60 minutes at a temperature of room temperature to 150° C. at each step. In certain embodiments, steps 2), 4), and 6) are included and the substrate is incubated for 1 to 60 minutes at a temperature of room temperature to 80° C. at each step. In certain embodiments, steps 2), 4), and 6) are included and the substrate is incubated for 1 to 60 minutes at a temperature of room temperature to 80° C. for step 2) and at room temperature for steps 4) and 6).

In certain embodiments, step 3) is included and step 7) is omitted.

In certain embodiments, step 3) is included, step 7) is omitted, and steps 2), 4), and 6) are included and the substrate is incubated for 1 to 60 minutes at a temperature of room temperature to 150° C. at each step. In certain embodiments, step 3) is included, step 7) is omitted, steps 2), 4), and 6) are included and the substrate is incubated for 1 to 60 minutes at a temperature of room temperature to 80° C. at each step. In certain embodiments, step 3) is included, step 7) is omitted, and steps 2), 4), and 6) are included and the substrate is incubated for 1 to 60 minutes at a temperature of room temperature to 80° C. for step 2) and at room temperature for steps 4) and 6).

A linking agent is added to the biodegradable material during the methods described. The linking agent may be added at step 3), at step 7), or both steps 3) and 7). In certain aspects, the linking agent is added only at step 3). When a linking agent is added at both steps 3) and 7), the linking agent used may be the same at both steps or the linking agent used at step 3) may be different than the linking agent used at step 7). In certain aspects, the linking agent is a divalent cation (for example, calcium added as calcium chloride) and the divalent cation is added at step 7) only or step 3 only. In certain aspects, the linking agent is a divalent cation as described herein (for example, calcium added as calcium chloride) and the divalent cation is added at both steps 3) and 7). In certain aspects, the linking agent is a trivalent cation as described herein (for example, aluminum added as aluminum chloride) and the trivalent cation is added at step 7) only or step 3 only. In certain aspects, the linking agent is a trivalent cation as described herein (for example, aluminum added as aluminum chloride) and the trivalent cation is added at both steps 7) and 3). In certain aspects, two linking agents are used, wherein one linking agent is a divalent cation as described herein (for example, calcium added as calcium chloride) and one linking agent is a trivalent cation as described herein (for example, aluminum added as aluminum chloride), and the mixture of divalent/trivalent cations are each added at step 3), step 7) or both steps 3) and 7). In certain aspects, two linking agents are used wherein one linking agent is a divalent cation as described herein (for example, calcium added as calcium chloride) and one linking agent is a trivalent cation as described herein (for example, aluminum added as aluminum chloride), and the divalent cation is added at step 3) and the trivalent cation is added at step 7) or the divalent cation is added at step 7) and the trivalent cation is added at step 3).

In one aspect of this method, the first polymer may applied to the substrate in a liquid form and/or the second polymer may be applied to the substrate comprising polymer 1 in a liquid form. Furthermore, in certain aspects, the linking agent may be applied to the substrate comprising the first polymer and/or the first polymer and the second polymer in a liquid form. In certain aspects, the first polymer, the second polymer, and the linking agent are applied in liquid form. When the first polymer, the second polymer, and/or the linking agent are applied in a liquid form, the solution of the first polymer, the second polymer and/or the linking agent may further comprise one or more of the plasticizer, the stabilizer, the preservative, and the surfactant. In one embodiment, the solution of the first and/or second polymers further comprises the stabilizer and the solution of the linking agent further comprises the plasticizer.

In one aspect of this method, the first polymer is polymer 1 as described herein and the second polymer is polymer 2 as described herein. In one aspect of this method, the first polymer is polymer 2 as described herein and the second polymer is polymer 1 as described herein. In one aspect of this method, the first polymer is an alginic acid polymer as described herein (including in the Preferred Biodegradable Compositions section) and the second polymer is an HPMC polymer as described herein (including in the Preferred Biodegradable Compositions section). In one aspect of this method, the first polymer is an HPMC polymer as described herein (including in the Preferred Biodegradable Compositions section) and the second polymer is an alginic acid polymer as described herein (including in the Preferred Biodegradable Compositions section).

When the first polymer, the second polymer, and/or the linking agent are applied in a liquid form, a solution of the first polymer is prepared by solubilizing the first polymer in a first solvent, a solution of the second polymer is prepared by solubilizing the second polymer in a second solvent, and a solution of the linking agent is prepared by solubilizing the linking agent in a third solvent. The choice of first, second and third solvents may depend on the nature of the first polymer, the nature of the second polymer, the nature of the linking agent, and/or the nature of the additional ingredients. The first, second, and/or third solvents may be the same or may be different. The first, second, and third solvents are preferably selected to be compatible with food products. In certain preferred embodiments, the first, second, and/or third solvents are water, such as for example, deionized (DI) water. In certain preferred embodiments, the first, second, and/or third solvents are water, such as for example, deionized (DI) water, and at least one of the first, second or third solvents contains an azeotrope (such as, but not limited to a binary azeotrope) to aid in the removal of water when the biodegradable material is applied in a liquid form. Suitable azeotropes include, but are not limited to, ethanol, n-propanol, iso-propanol, n-butanol, sec-butanol, iso-butanol, tert-butanol, allyl alcohol, benzyl alcohol, furfuryl alcohol, dilute organic acids, dilute mineral acids, ethyl acetate, methyl acetate, n-propyl acetate, and ethyl nitrate.

In another embodiment, the present disclosure provides for a method of applying a biodegradable material of the present disclosure to a substrate, the method comprising the steps of: 1) applying a first polymer to a substrate; 2) optionally incubating the substrate for a period of time (for example to allow for drying); 3) optionally contacting the first polymer on the substrate with a linking agent; 4) optionally incubating the substrate for a period of time (for example to allow for drying); 5) applying a second polymer to the substrate; 6) optionally incubating the substrate for a period of time (for example to allow for drying); 7) optionally contacting the second polymer on the substrate with a linking agent; 8) optionally incubating the substrate for a period of time (for example to allow for drying); 9) applying an additional amount of the first polymer or the second polymer to the substrate; 10) optionally incubating the substrate for a period of time (for example to allow for drying); 11) optionally contacting the first polymer or second polymer on the substrate with a linking agent, provided that a linking agent is added at either step 3 step 6, or step 11.

Such method may further comprising adding additional amounts of polymer 1 and/or 2 by repeating steps 9-11.

Such method may further comprise one or more of the following steps after step 11): i) incubating the substrate to allow the biodegradable material to form a linked network and/or curing the substrate to aid in the formation of the linked network; and ii) curing the substrate (for example, ultraviolet curing) to aid in the formation of the linked network.

In one aspect of this method, the biodegradable material may further comprises a plasticizer. In another aspect of this method, the biodegradable material may further comprise at least one of a plasticizer and a stabilizer. In another aspect of this method, the biodegradable material may further comprise at least one of a plasticizer, a surfactant, and a stabilizer. In another aspect of this method, the biodegradable material may further comprise at least one of a plasticizer, a surfactant, a stabilizer, and a preservative.

After polymer 1 is applied to the substrate or after polymer 2 has been applied to the substrate comprising polymer 1, the substrate may be incubated for a period of time before additional steps are carried out. In certain aspects, polymer 1 on the substrate is not allowed to dry completely. In certain aspects, polymer 2 on the substrate comprising polymer 1 is not allowed to dry. In certain aspects, polymer 2 on the substrate comprising polymer 1 is allowed to dry completely. The period of time may be from 1 minute to 4 hours at a desired temperature. Suitable temperatures range from 10° C. to room temperature or room temperature to 150° C. or higher (i.e., below the melting temperature for the polymer 1 and polymer 2). In certain aspects, the substrate is incubated at room temperature for 1 to 30 minutes. In certain aspects, the substrate is incubated at room temperature for 1 to 60 minutes. In certain aspects, the substrate is incubated at 70-80° C. for 1 to 30 minutes or 1 to 60 minutes. In certain aspects, the substrate is incubated at room temperature for 1 to 30 minutes or 1 to 60 minutes.

In certain embodiments, step 2) is included and the substrate is incubated for 1 to 60 minutes at a temperature of room temperature to 150° C. In certain embodiments, step 2) is included and the substrate is incubated for 1 to 60 minutes at a temperature of room temperature to 80° C.

In certain embodiments, step 4) is included and the substrate is incubated for 1 to 60 minutes at a temperature of room temperature to 150° C. In certain embodiments, step 4) is included and the substrate is incubated for 1 to 60 minutes at a temperature of room temperature to 80° C.

In certain embodiments, step 6) is included and the substrate is incubated for 1 to 60 minutes at a temperature of room temperature to 150° C. In certain embodiments, step 6) is included and the substrate is incubated for 1 to 60 minutes at a temperature of room temperature to 80° C.

In certain embodiments, step 8) is included and the substrate is incubated for 1 to 60 minutes at a temperature of room temperature to 150° C. In certain embodiments, step 8) is included and the substrate is incubated for 1 to 60 minutes at a temperature of room temperature to 80° C.

In certain embodiments, step 10) is included and the substrate is incubated for 1 to 60 minutes at a temperature of room temperature to 150° C. In certain embodiments, step 10) is included and the substrate is incubated for 1 to 60 minutes at a temperature of room temperature to 80° C.

In certain embodiments, steps 2), 4), 6), 8), and 10) are included and the substrate is incubated for 1 to 60 minutes at a temperature of room temperature to 150° C. at each step. In certain embodiments, steps 2), 4), 6), 8), and 10) are included and the substrate is incubated for 1 to 60 minutes at a temperature of room temperature to 80° C. at each step. In certain embodiments, steps 2), 4), 6), 8), and 10) are included and the substrate is incubated for 1 to 60 minutes at a temperature of room temperature to 80° C. for steps 2), 6), 8), and 10) and at room temperature for step 4). In certain embodiments, step 6) is omitted, steps 2), 4), 8), and 10) are included and the substrate is incubated for 1 to 60 minutes at a temperature of room temperature to 80° C. for steps 2), 8), and 10) and at room temperature for step 4).

In certain embodiments, steps 3) and 7) are included and step 11) is omitted.

In certain embodiments, steps 3) and 7) are included, step 11) is omitted, steps 2), 4), 6), 8), and 10) are included and the substrate is incubated for 1 to 60 minutes at a temperature of room temperature to 150° C. at each step. In certain embodiments, steps 3) and 7) are included, step 11) is omitted, steps 2), 4), 6), 8), and 10) are included and the substrate is incubated for 1 to 60 minutes at a temperature of room temperature to 80° C. at each step. In certain embodiments, steps 3) and 7) are included, step 11) is omitted, steps 2), 4), 6), 8), and 10) are included and the substrate is incubated for 1 to 60 minutes at a temperature of room temperature to 80° C. for steps 2), 6), 8), and 10) and at room temperature for step 4). In certain embodiments, steps 3) and 7) are included, steps 6) and 11) are omitted, steps 2), 4), 8), and 10) are included and the substrate is incubated for 1 to 60 minutes at a temperature of room temperature to 80° C. for steps 2), 8), and 10) and at room temperature for step 4).

A linking agent is added to the biodegradable material during the methods described. The linking agent may be added at step 3), at step 7), at step 11), or one or more or all of steps 3), 7) and 11). In certain aspects, the linking agent is added only at step 3) or only at step 7), or only at steps 3) and 7). When a linking agent is added at multiple steps, the linking agent used may be the same at the multiple steps or the linking agent used at the multiple steps may be different. In certain aspects, the linking agent is a divalent cation as described herein (for example, calcium added as calcium chloride) and the divalent cation is added at step 3) only (with a trivalent cation as described herein, such as aluminum added as aluminum chloride, optionally being used at steps 7) and 11)) or step 3) and step 7) only (with a trivalent cation as described herein, such as aluminum added as aluminum chloride, optionally being used at step 11)). In certain aspects, the linking agent is a divalent cation as described herein (for example, calcium added as calcium chloride) and the divalent cation is added at steps 3), 7) and 11). In certain aspects, the linking agent is a trivalent cation as described herein (for example, aluminum added as aluminum chloride) and the trivalent cation is added at step 3) only (with a divalent cation as described herein, such as calcium added as calcium chloride, optionally being used at steps 3) and 11)) or step 3) and step 7) only (with a divalent cation as described herein, such as calcium added as calcium chloride, optionally being used at step 11). In certain aspects, the linking agent is a trivalent cation as described herein (for example, aluminum added as aluminum chloride) and the trivalent cation is added at steps 3), 7), and 11). In certain aspects, two linking agents are used, wherein one linking agent is a divalent cation as described herein (for example, calcium added as calcium chloride) and one linking agent is a trivalent cation as described herein (for example, aluminum added as aluminum chloride), and the mixture of divalent/trivalent cations are each added at step 3), step 7), step 11), or one or more of steps 3), 7), and 11).

In one aspect of this method, polymer 1 may applied to the substrate in a liquid form and polymer 2 may be applied to the substrate comprising polymer 1 in a liquid form. Furthermore, in certain aspects, the linking agent may be applied to the substrate comprising polymer 1 and/or polymer 1 and polymer 2 in a liquid form. In certain aspects, polymer 1, polymer 2 and the linking agent are applied in liquid form. When the first polymer, the second polymer, and/or the linking agent are applied in a liquid form, the solution of the first polymer, the second polymer and/or the linking agent may further comprise one or more of the plasticizer, the stabilizer, the preservative, and the surfactant. In one embodiment, the solution of the first and/or second polymers further comprises the stabilizer and the solution of the linking agent further comprises the plasticizer.

In one aspect of this method, the first polymer is polymer 1 as described herein and the second polymer is polymer 2 as described herein. In one aspect of this method, the first polymer is polymer 2 as described herein and the second polymer is polymer 1 as described herein. In one aspect of this method, the first polymer is an alginic acid polymer as described herein (including in the Preferred Biodegradable Compositions section) and the second polymer is an HPMC polymer as described herein (including in the Preferred Biodegradable Compositions section). In one aspect of this method, the first polymer is an HPMC polymer as described herein (including in the Preferred Biodegradable Compositions section) and the second polymer is an alginic acid polymer as described herein (including in the Preferred Biodegradable Compositions section).

When the first polymer, the second polymer, and/or the linking agent are applied in a liquid form, a solution of the first polymer is prepared by solubilizing the first polymer in a first solvent, a solution of the second polymer is prepared by solubilizing the second polymer in a second solvent, and a solution of the linking agent is prepared by solubilizing the linking agent in a third solvent. The choice of first, second and third solvents may depend on the nature of the first polymer, the nature of the second polymer, the nature of the linking agent, and/or the nature of the additional ingredients. The first, second, and/or third solvents may be the same or may be different. The first, second, and third solvents are preferably selected to be compatible with food products. In certain preferred embodiments, the first, second, and/or third solvents are water, such as for example, deionized (DI) water. In certain preferred embodiments, the first, second, and/or third solvents are water, such as for example, deionized (DI) water, and at least one of the first, second or third solvents contains an azeotrope (such as, but not limited to a binary azeotrope) to aid in the removal of water when the biodegradable material is applied in a liquid form. Suitable azeotropes include, but are not limited to, ethanol, n-propanol, iso-propanol, n-butanol, sec-butanol, iso-butanol, tert-butanol, allyl alcohol, benzyl alcohol, furfuryl alcohol, dilute organic acids, dilute mineral acids, ethyl acetate, methyl acetate, n-propyl acetate, and ethyl nitrate.

In any of the foregoing embodiments, a solution of polymer 1/polymer 2 mixture, the first polymer, the second polymer and/or the linking agent has or is adjusted to have a defined pH. In certain aspects, the solution has an acidic pH. Suitable pH ranges include a pH of from 2 to 6, from 3 to 6, and 3 to 4.

In any of the foregoing embodiments, the polymer 1/polymer 2 mixture, and the first polymer and the second polymer may be applied to a substrate by methods other than spraying or spray drying. Suitable additional methods include, but are not limited to, coating, extrusion coating and extrusion laminating.

Exemplary coating processes include, but are not limited to, gravure coating, size press coating, curtain coating, bar or rod coating, and dip coating. When the biodegradable material is applied as 2 or more polymer layers, the same process may be used to apply the 2 or more polymer layers or the same process may be used. In an exemplary gravure coating application, gravure roll with an unevenly engraved surface is immersed in the coating fluid (i.e., a polymer composition) in a reservoir. After the coating fluid on the surface of the gravure roll is wiped off with the doctor blade, the fluid remaining in the pits are transferred onto the web of the substrate. Pressurized gravure coating applications may also be used.

In an exemplary curtain coating application, a polymer composition is applied to a substrate from a reservoir with an opening sized to provide a curtain of polymer composition to the substrate that is moving at a predetermined rate (for example, on a conveyor belt).

In an exemplary size press coating application, an application roll in contact with a reservoir of the polymer composition transfers the polymer composition to a substrate moving at a predetermined rate, while a counter roll applies pressure the substrate.

In an exemplary coating rod application, a movable coating rod applies a polymer composition to a stationary substrate. In an exemplary dip coating application, a substrate is dipped into a reservoir of the polymer composition or moved through a bath of the polymer composition.

In an exemplary extrusion coating process, a melted extrudate (i.e., a polymer composition) is applied to a substrate and the extrudate as a viscous liquid flows over the substrate. The substrate/exudate combination may further undergo a bonding process, for example using a pressure roll and a cooled counter-pressure roll.

An exemplary extrusion lamination process operates in a similar manner, with the exception that the exudate is sandwiched between two substrates, which may be the same or different.

Kit

The present disclosure also provides a kit comprising one or more materials required to produce a biodegradable material as disclosed herein. In one aspect of this embodiment, the kit comprises an amount of polymer 1, and an amount of polymer 2, and optionally, an amount of one or more of a linking agent, a surfactant, a stabilizer, a plasticizer and a preservative. In another aspect of this embodiment, the kit comprises an amount of polymer 1, an amount of polymer 2, and an amount of a linking agent and optionally, an amount of one or more of a plasticizer, a surfactant, a stabilizer, and a preservative. In another aspect of this embodiment, the kit comprises an amount of polymer 1, an amount of polymer 2, and an amount of a plasticizer and optionally, an amount of one or more of a linking agent, a surfactant, a stabilizer, and a preservative. In another aspect of this embodiment, the kit comprises an amount of polymer 1, an amount of polymer 2, an amount of a linking agent, a plasticizer, and an amount of a stabilizer and optionally, an amount of one or more of a linking agent, a surfactant, and a preservative. In another aspect of this embodiment, the kit comprises an amount of polymer 1, an amount of polymer 2, an amount of a plasticizer, an amount of a surfactant, and an amount of a stabilizer.

In any of the foregoing, the kit may further comprise one or more of instructions for formulating the biodegradable material, instructions for applying the components of the kit to a substrate, a substrate, and a solvent.

In any of the foregoing, a preferred polymer 1 is alginic acid, or a salt or solvate thereof, a preferred polymer 2 is a cellulose ether, a preferred plasticizer is glycerol, triglyceride vegetable oil or a compound of formula VIA, a preferred stabilizer is xanthan gum, a preferred surfactant is triglyceride vegetable oil or a compound of formula VIA, and a preferred linking agent is a divalent or trivalent cation, such as calcium or aluminum (which may be provided in their salt forms). A preferred cellulose ether is HPMC, including HPMC having a methoxy substitution and a hydroxypropyl substitution of as described herein.

Substrate Comprising a Biodegradable Material

The present disclosure also provides for a substrate comprising a biodegradable material of the present disclosure. The biodegradable material may be any biodegradable material described herein, including a biodegradable material described under the "Preferred Biodegradable Compositions" section. The substrate may be any substrate described herein. Further, the biodegradable coating may be applied using any of the methods described herein, including the methods in the Example Section.

The substrate comprising the biodegradable material of the present disclosure serves as an environmental barrier to prevent or reduce an environmental factor from contacting a product contained in a package comprising the material of the present disclosure. In a preferred use, the product is a food product. Environmental factors include, but are not limited to, water vapor and oxygen.

In one embodiment, the substrate comprising the biodegradable material of the present disclosure serves as a water vapor barrier to prevent water vapor from contacting a product contained in a package comprising the material of the present disclosure or to reduce the amount of water vapor that contacts a product contained in a package comprising the material of the present disclosure. In a preferred use, the product is a food product.

In another embodiment the substrate comprising the biodegradable material of the present disclosure serves as an oxygen barrier to prevent oxygen from contacting a product contained in a package comprising the material of the present disclosure or to reduce the amount of oxygen that contacts a product contained in a package comprising the material of the present disclosure. In a preferred use, the product is a food product.

In another embodiment the substrate comprising the biodegradable material of the present disclosure serves as a water vapor and oxygen barrier to prevent water vapor and oxygen from contacting a product contained in a package comprising the material of the present disclosure or to reduce the amount of water vapor and oxygen that contacts a product contained in a package comprising the material of the present disclosure. In a preferred use, the product is a food product.

In another embodiment, the substrate comprising the biodegradable material of the present disclosure provides an OTR (determined as described in the Examples section) of less than or equal to 100 cc/m$^2$/day, 75 cc/m$^2$/day, 50 cc/m$^2$/day, 25 cc/m$^2$/day, 20 cc/m$^2$/day, 15 cc/m$^2$/day, 10 cc/m$^2$/day, 5 cc/m$^2$/day, 3 cc/m$^2$/day, 2 cc/m$^2$/day, or 1 cc/m$^2$/day.

EXAMPLES

Example 1—Production and Testing of One Embodiment of the Material of the Present Disclosure This example describes the preparation of one embodiment of a biodegradable material according to the present disclosure for use as a coating to be applied to a substrate (acid free Kraft paper, 120-176 grammage weight; g/m$^2$). In this example, polymer 1 is sodium alginate (the sodium salt of alginic acid), polymer 2 is HPMC F50 (methoxy substitution of 27-30% and hydroxypropyl substitution at 4 to 7.5%), the linking agent is calcium chloride, the plasticizer is glycerol, the preservative is sodium citrate, and the stabilizer is xanthan gum.

An alginate solution was prepare by adding 2.44 g Sodium Alginate (1.0% wt/volume solvent) and 340 mg of sodium citrate (0.15% wt/volume solvent) to 237 ml of DI water. The solution was mixed at room temperature until the components were in solution. A solution of HPMC F50 was prepared by adding 20 g of HPMC F50 (3.7% wt/volume solvent) and 1.5 g of xanthan gum (0.28% wt/volume solvent) into 521 ml of DI water. The solution was mixed at room temperature until the components were in solution. A solution of the linking agent was prepared by adding 1000 g calcium chloride (32.2% wt/volume solvent) and 106 g glycerol (3.4% wt/volume solvent) to 2,000 ml of DI water. The solution was mixed at room temperature until the components were in solution and allowed to cool. The solution was filtered with Whatman #5 in side arm flask before use (<2.5 μm particle retention).

The alginate solution was sprayed onto a substrate at room temperature using a standard high volume, low pressure sprayer with a 2 mm or greater aperture using a pressure of 100 pounds per square inch gauge (psig). The spray drying process is designed to atomize the solution and evaporate most of the water immediately. The substrate was incubated in a convection oven at 80° C. for 30 minutes. The substrate was then covered in a bath of the linking agent for 3 min at 70° C. The substrate was removed from the linking agent bath and allowed to air dry for 30 min at room temperature. Subsequently, the HPMC solution was applied to the substrate by spraying as described for the alginate solution and the material was allowed to air dry for 30 min at room temperature.

The oxygen transmission rate (OTR) of the film (25 μM in thickness) was determined (with substrate attached) under the following conditions: 20° C., 75% relative humidity, 100% oxygen environment at 20 PSIG. The oxygen transmission rate is reported as cc/$m^2$/day. The material prepared as described has an OTR of 19 cc/$m^2$/day. Furthermore, as discussed herein the material of the present disclosure is biodegradable in soil in 3 months or less. For reference, a table of OTR for commonly used packaging materials (determined under the same conditions and at the same thickness as described above) along with biodegradation characteristics is provided in Table 1 below.

TABLE 1

| Material | OTR cc/$m^2$/ day | Degrades In |
|---|---|---|
| Ethylene vinyl alcohol (EVA) | 0.19 | Oceans in 100 to 500 years |
| Metallized polyester (OPET) | 1.7 | Soil in 100 to 10,000 years |
| Low density polyethylene (LDPE) | 450 | |
| Polypropylene | 100 | |
| High density polyethylene (HDPE) | 150 | |
| Oriented polypropylene (OPP) | 100 | |
| Poly lactic acid | >500 | Water, quickly |

As you can see, the material described in the present disclosure has an OTR that is superior to most non-biodegradable materials and superior to the best biodegradable material currently on the market (poly lactic acid).

Example 2—Production and Testing of an Alternate Embodiment of the Material of the Present Disclosure This example describes the preparation of an additional embodiment of a material according to the present disclosure for use as a coating to be applied to a substrate (acid free Kraft paper, 120-176 grammage weight; g/$m^2$). In this example, polymer 1 is sodium alginate (the sodium salt of alginic acid), polymer 2 is HPMC F50 (methoxy substitution of 27-30% and hydroxypropyl substitution at 4 to 7.5%), the linking agent is calcium chloride, the plasticizer is glycerol, the preservative is citric acid, and the stabilizer is xanthan gum.

The alginate solution, HPMC F50 solution, and the linking agent solution was prepared as described in Example 1.

The alginate solution was sprayed onto a substrate at room temperature using a standard high volume, low pressure sprayer with a 2 mm or greater aperture using a pressure of 100 psig. The spray drying process is designed to atomize the solution and evaporate most of the water immediately. The substrate was incubated at room temperature for 30 minutes. The substrate was then covered in a bath of the linking agent for 3 min at 70° C. The substrate was removed from the linking agent bath and allowed to air dry for 30 min at room temperature. Subsequently, the HPMC solution was applied to the substrate by spraying as described for the alginate solution and the material was allowed to air dry for 30 min at room temperature.

The OTR was determined as described in Example 1. The material prepared as described has an OTR of <2 cc/$m^2$/day. Furthermore, as discussed herein the material of the present disclosure is biodegradable in soil in 3 months or less.

As you can see, the material described in the present disclosure has an OTR that is superior to most non-biodegradable materials and superior to the best biodegradable material currently on the market (poly lactic acid). Further, the material prepared as described in Example 2 has an OTR that is approximately 5-fold lower than the OTR of the material described in Example 1.

Example 3—Production and Testing of an Alternate Embodiment of the Material of the Present Disclosure This example describes the preparation of an additional embodiment of a material according to the present disclosure for use as a coating to be applied to a substrate (acid free Kraft paper, 120-176 grammage weight; g/$m^2$). In this example, polymer 1 is sodium alginate (the sodium salt of alginic acid), polymer 2 is HPMC F50 (methoxy substitution of 27-30% and hydroxypropyl substitution at 4 to 7.5%), the linking agent is calcium chloride and the stabilizer is xanthan gum (the plasticizer is omitted from this embodiment).

The alginate solution, HPMC F50 solution, and the linking agent solution was prepared as described in Example 1, with the exception that the linking agent solution did not contain glycerol.

The alginate solution was sprayed onto a substrate at room temperature using a standard high volume, low pressure sprayer with a 2 mm or greater aperture using a pressure of 100 psig. The spray drying process is designed to atomize the solution and evaporate most of the water immediately. The substrate was incubated at room temperature for 30 minutes. The substrate was then covered in a bath of the linking agent for 3 min at 70° C. The substrate was removed from the linking agent bath and allowed to air dry for 30 min at room temperature. Subsequently, the HPMC solution was applied to the substrate by spraying as described for the alginate solution and the material was allowed to air dry for 30 min at room temperature.

The OTR was determined as described in Example 1. The material prepared as described has an OTR of approximately 40 cc/$m^2$/day. Furthermore, as discussed herein the material of the present disclosure is biodegradable in soil in 3 months or less.

As you can see, the material described in the present disclosure has an OTR that is superior to most non-biodegradable materials and superior to the best biodegradable material currently on the market (poly lactic acid). Further, the material prepared as described in Example 3 has an OTR that is approximately 2 and 20-fold higher than the OTR of the material described in Examples 1 and 2, respectively.

Example 4—Production and Testing of an Alternate Embodiment of the Material of the Present Disclosure This example describes the preparation of an additional embodiment of a material according to the present disclosure for use as a coating to be applied to a substrate (acid free Kraft paper, 120-176 grammage weight; g/$m^2$). In this example, polymer 1 is HPMC F50 (methoxy substitution of 27-30% and hydroxypropyl substitution at 4 to 7.5%), polymer 2 is sodium alginate (the sodium salt of alginic acid), the linking agent is calcium chloride, the plasticizer is glycerol and the stabilizer is xanthan gum.

A 3.0% solution (wt/volume solvent) of HPMC F50 containing 0.15% xanthan (wt/volume solvent) was prepared in DI water (96.85%). The solution was mixed at room temperature until the components were in solution. A 3.0% (wt/volume solvent) alginate solution was prepared in DI water (97.0%). The solution was mixed at room temperature until the components were in solution. A solution of the linking agent was prepared by adding 1000 g calcium chloride (32.2% wt/volume solvent) and 106 g glycerol (3.4% wt/volume solvent) to 2,000 ml of DI water. The solution was mixed at room temperature until the components were in solution and allowed to cool. The solution was filtered with Whatman #5 in side arm flask before use (<2.5 μm particle retention).

The HPMC F50 solution was sprayed onto a substrate at room temperature using a standard high volume, low pressure sprayer with a 2 mm or greater aperture using a pressure of 100 psig. The spray drying process is designed to atomize the solution and evaporate most of the water immediately. The substrate was incubated in a convection oven at 70° C. for 15 minutes. The solution of linking agent was then applied to the substrate as described for the HPMC solution and the substrate was allowed to dry to dampness at room temperature. The alginic acid solution was then applied to the substrate as describe for the HPMC F50 solution. An additional application of the solution of the linking agent was then applied to the substrate as described for the HPMC F50 solution and the substrate was incubated in a convection oven at 70° C. for 15 minutes. The substrate was incubated in a convection oven at 70° C. for 15 minutes. An additional application of the HPMC F50 solution was then applied to the substrate as described for the initial HPMC F50 solution and the substrate was incubated in a convection oven at 70° C. for 15 minutes.

The total thickness of the applied biodegradable material was approximately 30 μm. The OTR was determined as described in Example 1. The material prepared as described has an OTR of <1.0 cc/m$^2$/day. Furthermore, as discussed herein the material of the present disclosure is biodegradable in soil in 3 months or less.

As you can see, the material described in the present disclosure has an OTR that is superior to most non-biodegradable materials and superior to the best biodegradable material currently on the market (poly lactic acid). The material prepare as described in Example 4 provided an OTR that is approximately 20-fold, 2-fold, and 40-fold lower than the OTR of the material described in Examples 1-3 respectively.

What is claimed:

1. A packaging material for use in containing prepared food items, wherein the packaging material comprises:

a biodegradable substrate;

a biodegradable water vapor barrier film on a surface of the substrate;

wherein the water vapor barrier film comprises a first polymer, a second polymer, and a calcium ion linking agent;

wherein the film polymer is a polysaccharide polymer or a salt or a solvate thereof;

wherein the second polymer is a cellulose ether or salt or solvate thereof;

wherein the first polymer, the second polymer, and the linking agent are configured to form a linked network such that the first polymer and the second polymer are linked at multiple points along a first polymer backbone of the first polymer and the second polymer backbone of the second polymer.

2. The packaging material of claim 1, wherein the first polymer is selected from the group consisting of: an alginic acid polymer, or a salt or solvate thereof, and an ulvan polymer, or a salt or solvate thereof.

3. The packaging material of claim 1, wherein the first polymer is selected from the group consisting of the formula ID, or a salt or solvate thereof:

ID

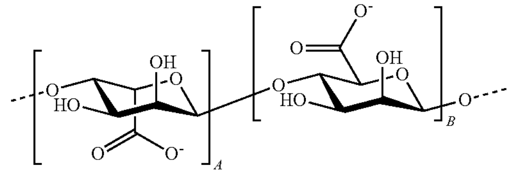

wherein:

A and B are each independently an integer from 50 to 4,000 and the total of A and B is less than 5,000.

4. The packaging material of claim 1, wherein the second polymer is selected from the group consisting of the formula V, or a salt or solvate thereof:

V

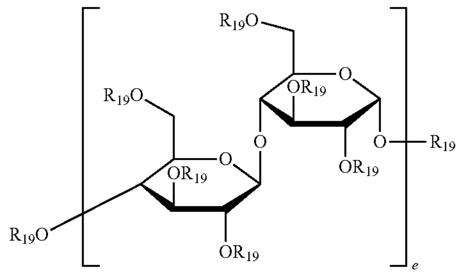

wherein $R_{19}$ is independently for each occurrence —H, —$CH_3$, —$[CH_2CH(CH_3)O]_fH$, —$[CH_2CH(CH_3)O](CH_3$, -[(alkylene)O]H, —$[CH_2C(O)O]_dH$, —$C(O)CH_3$, —$C(O)CH_2CH_2C(O)OH$, or —$[CH_2CH(CH_3)O]_fR_{19a}$;

$R_{19a}$ is independently for each occurrence —H, —$CH_3$, —$C(O)CH_3$, or —$C(O)CH_2CH_2C(O)OH$;

alkylene is a C1 to C6 unsubstituted alkylene chain or a C1 to C6 substituted alkylene chain, where the alkylene chain is substituted by one to three —$CH_3$, —$CH_2CH_3$, —$CH(CH_3)CH_3$, or —$CH_2CH_2CH_3$ groups;

d is independently for each subunit an integer from 1 to 6;

f is independently for each subunit an integer from 1 to 6; and e is an integer from 50 to 8,000.

5. The packaging material of claim 1, wherein the second polymer is hydroxypropyl methylcellulose having a methoxy substitution ranging from 16.5 to 20%; and a hydroxypropyl substitution ranging from 7 to 12%.

6. The packaging material of claim 1, wherein the second polymer is selected from the group consisting of hydroxypropyl methylcellulose, hydroxypropyl cellulose, hydroxyethyl cellulose, carboxymethyl cellulose, or hydroxypropyl methylcellulose acetate succinate, or a salt or solvate of any of the foregoing.

7. The packaging material of claim 1, wherein the second polymer is hydroxypropyl methylcellulose, or a salt or solvate thereof, the first polymer is an alginic acid polymer, or a salt or solvate thereof, and the water vapor barrier further includes a plasticizer and a stabilizer.

8. The packaging material of claim 7, wherein:

the plasticizer is a triglyceride vegetable oil derived from the group consisting of soybean oil, linseed oil, castor-oil, and sunflower oil; and the stabilizer is a polysaccharide having a repeating unit of glucose, mannose, and glucuronic acid subunits.

9. The packaging material of claim 1, wherein the polysaccharide polymer is derived from a cell wall structural component of an algae, and the algae is from class Chlorophyta, Phaeophyta, or Rhodophyta.

10. The packaging material of claim 1, wherein the biodegradable water vapor barrier film further comprises an anti-microbial agent or anti-viral agent functioning as a preservative and derived from the group consisting of a quaternary ammonium cation, a tocopherol, a tocotrienol, a diol, an essential oil, a calcium phosphate, a sorbic acid, an ascorbic acid, a sodium benzoate, and an acid.

* * * * *